United States Patent [19]

Yamasaki et al.

[11] Patent Number: 5,895,576
[45] Date of Patent: Apr. 20, 1999

[54] METHOD AND APPARATUS FOR WASTEWATER TREATMENT BY CHEMICAL REACTION OF REACTIVE FILLER AND PROPAGATED MICROORGANISMS

[75] Inventors: Kazuyuki Yamasaki, Asaminami-ku; Kazuyuki Sakata, Fukuyama; Atsushi Yokotani, Fukuyama, all of Japan

[73] Assignee: Sharp Kabushiki Kaisha, Osaka, Japan

[21] Appl. No.: 08/897,454

[22] Filed: Jul. 22, 1997

[30] Foreign Application Priority Data

Sep. 6, 1996 [JP] Japan ................... 8-236608

[51] Int. Cl.⁶ ..................... C02F 3/06; C02F 1/28
[52] U.S. Cl. .............. 210/614; 210/617; 210/618; 210/631; 210/143; 210/151; 210/195.1; 210/195.4
[58] Field of Search ................... 210/143, 150, 210/151, 195.1, 195.3, 195.4, 202, 220, 258, 259, 614, 616, 617, 618, 626, 631

[56] References Cited

U.S. PATENT DOCUMENTS

| 3,968,034 | 7/1976 | Tymoszczuk | 210/678 |
|---|---|---|---|
| 4,177,144 | 12/1979 | Hickey et al. | 210/678 |
| 4,322,296 | 3/1982 | Fan et al. | 210/678 |
| 4,566,971 | 1/1986 | Reiman et al. | 210/151 |
| 4,800,021 | 1/1989 | Desbos | 210/750 |
| 5,019,268 | 5/1991 | Rogalla | 210/151 |
| 5,304,308 | 4/1994 | Tsumura et al. | 210/674 |
| 5,330,652 | 7/1994 | Goldman et al. | 210/678 |
| 5,372,712 | 12/1994 | Petit | 210/678 |
| 5,462,666 | 10/1995 | Kimmel | 210/151 |
| 5,480,537 | 1/1996 | Yamasaki et al. | 210/151 |
| 5,580,458 | 12/1996 | Yamasaki et al. | 210/677 |

FOREIGN PATENT DOCUMENTS

| 54-107153 | 8/1979 | Japan. |
|---|---|---|
| 5-253576 | 10/1993 | Japan. |
| 5-254829 | 10/1993 | Japan. |

OTHER PUBLICATIONS

Translation of Japan 54-107153.
U.S. Application Serial No. 08/762,915 filed Dec. 10, 1996, "Apparatus and Method for Treating Waste Water both Chemically and Biologically Utilizing Reaction Fillers".

*Primary Examiner*—Christopher Upton
*Attorney, Agent, or Firm*—Nixon & Vanderhye p.c.

[57] ABSTRACT

An apparatus for wastewater treatment is provided which can efficiently treat wastewater containing organic matter and, in addition, fluorine, with a relatively small number of tanks required for such treatment. The apparatus includes a first tank adapted to allow wastewater to flow thereinto, the first tank comprising an upper portion having a calcium carbonate mineral mass of smaller granule size and an aeration tube for fluidizing such calcium carbonate mineral mass while aerating the same in the wastewater, an intermediate portion and a lower portion which respectively include a calcium carbonate mineral mass of medium granule size and a calcium carbonate mineral mass of larger granule size, the medium and larger granule size masses of calcium carbonate mineral constituting immobilizing carriers for microbial propagation, and a circulation pump for transferring treated water resulting from treatment in the upper portion to the lower portion. In the upper portion, calcium carbonate mineral is fluidized by aeration so as to treat the wastewater through chemical reaction and, in the intermediate portion and lower portion, organic matter in the wastewater is biologically treated by microorganisms.

33 Claims, 19 Drawing Sheets

Fig.9

| Tank | Detention Time | Timing (Detention Time) 1hr 2hr 3hr 4hr 5hr 6hr 7hr 8hr 9hr 10hr 11hr |
|---|---|---|
| ① In Case of Ordinary Fluorine Concentration | | |
| 1st Tank Upper Portion | 1hr | —— |
| 1st Tank Intermediate Portion | 30min. | — |
| 1st Tank Lower Portion | 30min. | — |
| Microbial Sludge Agitator Segment | 30min. | — |
| 2nd Tank (Precipitation Tank) | 3hr | ——— |
| 3rd Tank (Thickening Tank) | 5hr | ————— |
| ② In Case of Low Fluorine Concentration | | |
| 1st Tank Intermediate Portion | 0.5hr | — |
| 1st Tank Upper Portion | 15min. | — |
| 1st Tank Lower Portion | 15min. | — |
| Microbial Sludge Agitator Segment | 15min. | — |
| 2nd Tank (Precipitation Tank) | 3hr | ——— |
| 3rd Tank (Thickening Tank) | 5hr | ————— |

Fig.10

| Tank | Detention Time | Timing (Detention Time) 1hr 2hr 3hr 4hr 5hr 6hr 7hr 8hr 9hr 10hr 11hr |
|---|---|---|
| ① In Case of Ordinary Hydrogen Peroxide Concentration | | |
| 1st Tank Upper Portion | 1hr | — |
| 1st Tank Intermediate Portion | 30min. | — |
| 1st Tank Lower Portion | 30min. | — |
| Microbial Sludge Agitator Segment | 30min. | — |
| 2nd Tank (Precipitation Tank) | 3hr | ——— |
| 3rd Tank (Thickening Tank) | 5hr | ————— |
| ② In Case of Low Hydrogen Peroxide Concentration | | |
| 1st Tank Intermediate Portion | 0.5hr | — |
| 1st Tank Upper Portion | 15min. | — |
| 1st Tank Lower Portion | 15min. | — |
| Microbial Sludge Agitator Segment | 15min. | — |
| 2nd Tank (Precipitation Tank) | 3hr | ——— |
| 3rd Tank (Thickening Tank) | 5hr | ————— |

METHOD AND APPARATUS FOR WASTEWATER TREATMENT BY CHEMICAL REACTION OF REACTIVE FILLER AND PROPAGATED MICROORGANISMS

RELATED APPLICATIONS

This application is related to copending commonly assigned application Ser. No. 08/762,915 filed Dec. 10, 1996 now U.S. Pat. No. 5,849,194 naming Kazuyuki Yamasaki, Kazuyuki Sakata and Atsushi Yokotani as inventors.

BACKGROUND OF THE INVENTION

The present invention relates to a method and apparatus for wastewater treatment which can efficiently treat wastewater discharged from semiconductor and liquid crystal plants and the like that contains fluorine in addition to organic substances, such as surface active agents and organic solvents, with a relatively small number of tanks required for such treatment.

The present invention also relates to a method and apparatus for wastewater treatment which can efficiently treat wastewater that contains hydrogen peroxide in addition to organic substances, with a relatively small number of tanks.

From the view points of statutory laws and regulations for water pollution control, in the case where the wastewater contains, in addition to fluorine, organic substances, such as surfactant and organic solvents, it is necessary to treat the fluorine and also the organic substances to a predetermined concentration level. The presence of such organic matter in wastewater causes an increase in chemical oxygen demand (COD) and/or biochemical oxygen demand (BOD). Therefore, organic matter such as surface active agents in the wastewater must be positively removed despite the fact that they are chemically different from fluorine.

Hitherto, it has been usual practice that a mixed type of wastewater which contains, in addition to fluorine, organic substances, such as surfactant and organic solvents, is treated in such a way that the fluorine is first chemically treated by a chemical such as slaked lime in a tank and then, in a separate tank, organic matter, such as surfactant and organic solvents, are treated by employing a biological treatment method and/or a physical treatment method, such as activated carbon adsorption. This method for fluorine treatment using chemicals such as slaked lime and the like involves addition of chemicals in the process of treatment and, therefore, the resulting treated water has high electric conductivity. Therefore, such treated water has not been recycled for supply to ultrapure water production equipment.

As a typical example of conventional apparatus for removal of fluorine in wastewater there has been known one shown in FIG. 15. This apparatus for fluorine removal is such that fluorine-containing wastewater is fed into two separate calcium carbonate-packed tanks 533A and 533B for fluorine treatment therein (Japanese Patent Application Laid-Open No. 5-253576).

In this fluorine removal apparatus, fluorine-containing wastewater is fed into the calcium carbonate-packed tanks 533A and 533B for two-stage treatment, and outflow water is introduced into a circulation tank 542. The water under treatment in the circulation tank 542 is introduced into a membrane separation unit 543 in which the water is separated into condensed water containing calcium carbonate crystals flowed out of the second-stage calcium carbonate-packed tank 533B and membrane-permeated water. The condensed water is returned to the circulation tank 542. A part of the condensed water is returned to the first-stage calcium carbonate-packed tank 543A.

According to the arrangement of this fluorine removal apparatus, fluorine in the wastewater is immobilized to the calcium carbonate in the calcium carbonate-packed tanks 533A and 533B so that it is changed into calcium fluoride. After the lapse of a predetermined time period of treatment, such calcium fluoride is removed from the calcium carbonate-packed tanks 533A and 533B.

As another type of fluorine removal apparatus there has been known a calcium fluoride collecting apparatus as shown in FIG. 16 (Japanese Patent Application Laid-Open No. 5-254829). In this calcium fluoride collecting apparatus, a calcium carbonate reaction tank 644, or a reaction tank for reaction operation with respect to calcium fluoride, includes steam piping 647 which functions as a heating device, a blower 639 which functions as an air feeder device, and an aeration pipe 602. The calcium carbonate reaction tank 644 may include a vacuum deaerator (not shown).

Specifically, the calcium fluoride collecting apparatus incorporates a technique such that a supply of calcium carbonate from a calcium carbonate silo 646 is added to a fluorine-containing solution, the solution being then subjected to high temperature treatment at temperatures of 50 to 100° C., hot air through-flow treatment, and/or hot vacuum deaeration treatment, whereby calcium fluoride is collected.

In the case where the object for treatment is organic matter-containing fluorine wastewater, such a fluorine removal apparatus as described above is incorporated, as shown by reference numeral 770 in FIG. 17, for example, into a wastewater treatment system 780 for treating organic matter-containing fluorine wastewater produced in a production room 731 of a semiconductor plant.

Generally, in a production room 731 of a semiconductor plant which fabricates integrated circuits (ICs) and the like, there is installed a so-called etching device 737 as shown in FIG. 17. The etching device 737 involves use of an etching agent composed principally of hydrogen fluoride and/or ammonium fluoride.

With recent microstructure oriented development in the manufacture of ICs, there has been a growing tendency toward the use of etchants with an organic substance, typically surfactant included therein. Therefore, etching device 737 discharges organic matter-containing fluorine wastewater into wastewater treatment system 780.

Separately from etching device 737, an organic solvent consuming unit 732 exists within production room 731. Organic solvent consumption unit 732 is an organic solvent user such that it cleans the surface of a wafer with an organic solvent and dries the same. Organic solvent consumption unit 732 discharges organic solvent-containing wastewater. This organic solvent-containing wastewater is also introduced into the wastewater treatment system 780 for treatment therein. That is, the organic solvent-containing wastewater discharged from the organic solvent consumption unit 732 is also directed through a pipe 726 to flow into a raw water tank 735.

Thus, the organic solvent-containing wastewater and the fluorine-containing wastewater, combined together into organic matter-containing fluorine wastewater, flow through pipe 726A for entry into raw water tank 735. Then, the wastewater is pumped by a raw water tank pump 736 to flow through pipe 726B for being introduced upward into a fluorine removal unit 770. A treating tank 733 of the fluorine removal unit 770 is packed with calcium carbonate mineral. In treating tank 733, therefore, fluorine in the wastewater reacts with the calcium carbonate mineral to form calcium fluoride. Therefore, by separating calcium fluoride from the wastewater it is possible to remove fluorine present in the wastewater.

Aforesaid fluorine removal unit 770 is almost incapable of removing organic matter, such as surfactant and organic solvents. The wastewater which has been treated in the fluorine removal unit 770 is caused to flow into a precipitation tank 713 through a pipe 727. The concentration of fluorine in the precipitation tank 713 is detected by a fluorine concentration meter 715. Organic matter concentration in the settling tank 713 is comparatively high. Therefore, the wastewater is introduced from the precipitation tank 713 into a typical biological treatment unit 740 for biological treatment of organic matter, such as surfactant and organic solvents.

In FIG. 17, acid type exhaust gases from the etching device 737 are treated by acid scrubber 734, while organic exhaust gases from organic solvent consumption device 732 are treated in activated carbon adsorption columns 738A, 738B.

Next, description is given of a conventional wastewater treatment apparatus for treating hydrogen peroxide wastewater from semiconductor and/or liquid crystal plants which contains organic matter, such as surface active agents and organic solvents.

In case where wastewater contains, in addition to hydrogen peroxide, organic substances, such as surfactant and organic solvent, both the hydrogen peroxide and the organic substances cause an increase in COD (chemical oxygen demand) in the wastewater. Therefore, it is necessary that hydrogen peroxide and organic matter, such as surfactant and organic solvent, in the wastewater must be surely removed. In the past, such organic matter-containing hydrogen peroxide wastewater has been treated in such a way that first, hydrogen peroxide is catalytically treated with activated carbon or the like and then organic matter, such as surfactant and organic solvent, are treated in a separate tank.

Hitherto, a hydrogen peroxide removal apparatus for removing hydrogen peroxide in wastewater of the type shown in FIG. 19 has been known wherein hydrogen peroxide is catalytically treated with granular activated carbon (Japanese Patent Application Laid-Open No. 6-91258). This hydrogen peroxide removal apparatus 870 includes a treating tank 833 comprising a catalytic zone 911 partitioned by a bottom wire mesh 905 and a peripheral wall 906 and open upward, and a sedimentation zone 912 surrounding the outer side of the catalytic zone 911 with the peripheral wall 906 placed therebetween. At lower peripheral locations there are provided an opening 904 which allows the sedimentation zone 912 to be kept in communication with the catalytic zone 911, and a feed port 903 for enabling wastewater to horizontally flow into the catalytic portion 911. In operation, granular activated carbon is previously placed into the catalytic zone 911 in a quantity range of 1 to 35% of the effective tank capacity of the catalytic zone 911.

In that condition, hydrogen peroxide-containing wastewater from a pipe 807A is introduced into the treating tank 833 through the feed port 903 at the tank bottom. The hydrogen peroxide-containing wastewater flows into the catalytic zone 911 through the wire mesh 905 to fill the catalytic zone 911. Meanwhile, from a branched pipe 807B and through the horizontal feed port 904 is introduced hydrogen peroxide-containing wastewater (the flow rate of which is adjustable by a valve 920) into the catalytic zone 911. As a consequence, within the catalytic zone 911 there occurs an eddy current along with an upward current so that the granular activated carbon comes in contact with the hydrogen peroxide-containing wastewater, whereby the hydrogen peroxide in the wastewater is decomposed into water and hydrogen by the catalytic action of the activated carbon. The wastewater which has undergone such treatment overflows the edge of the catalytic zone 911 into the sedimentation zone 912 and is discharged from a discharge port 918 provided behind a baffle plate 917 via a pipe 827. In this case, some part of the granular activated carbon may overflow along with post-treatment wastewater into the sedimentation zone 912, but the so overflown granular activated carbon is allowed to be detained and precipitated for a while, being then returned to the catalytic zone 911 through the opening 907. Therefore, only supernatant is discharged from a discharge port 918 of the sedimentation zone 912.

A hydrogen peroxide removal apparatus is often incorporated in a wastewater treatment system 1080, as illustrated in FIG. 18, for example, for treating organic matter-containing hydrogen peroxide wastewater generated at a production room 1031 of a semiconductor plant.

Generally, in a production room 1031 of a semiconductor plant which manufactures ICs (integrated circuits) and the like, a large number of manufacturing units are installed, including RCA cleaning unit 1037 which performs so-called RCA cleaning process, and organic solvent utilization unit 1032 for use of organic solvents, such as acetone and isopropyl alcohol. Aforesaid RCA cleaning process is a cleaning technique developed by RCA Consumer Electronics and typically comprises a first step of removing organic matter by using $NH_4OH$, HCl, and $H_2O$, and a second step of removing alkali metal and/or heavy metal by using HCl, $H_2O_2$, and $H_2O$. With recent microstructure oriented development in the manufacture of ICs, there has been an increased tendency toward inclusion of surface active agents in above said $NH_4OH$ and HCl. Organic matter-mixed wastewater from RCA cleaning unit 1037 or the like which contains hydrogen peroxide and organic substances, such as surfactant and organic solvent, flows through a pipe 1026 into a raw water tank 1035 in which the wastewater is adjusted in both quantity and quality to a certain measure.

On the other hand, organic matter-containing wastewater from the organic solvent utilization unit 1032 flows into the raw water tank 1035 through a pipe 1026A. Therefore, the hydrogen peroxide-containing wastewater and the organic matter-containing wastewater meet into a combined stream in the pipe 1026A so that they are present as organic matter-containing hydrogen peroxide wastewater in the raw water tank 1035.

Next, the wastewater is introduced by a raw water pump 1036 into a hydrogen peroxide removal unit 1070 via a pipe 1026B. Hydrogen peroxide in the wastewater is decomposed into oxygen and water within a tank 1033 of the hydrogen peroxide removal unit 1070. In this hydrogen peroxide removal unit 1070, however, it is almost impossible to remove organic matter, such as surfactant and organic solvent. As such, the wastewater which has undergone aforesaid treatment is introduced into the treating tank 1028 through a pipe 1027. The concentration of hydrogen peroxide in the treating tank 1028 is detected by a oxidation-reduction potentiometer 1034. In case that the wastewater in the treating tank has a high concentration of hydrogen peroxide, the wastewater is introduced into a biological treatment unit (not shown) for treatment of organic matter.

Meanwhile, as FIG. 18 shows, exhaust gas emitted from RCA cleaning unit 1037 and/or organic solvent utilization unit 1032 which contains organic substances (organic matter-containing exhaust gas) is treated by a treating system 1090 for organic matter-containing exhaust gas as provided separately from the treating system 1080 for organic matter-containing hydrogen peroxide wastewater.

Reference characters 1038A and 1038B designate activated carbon adsorption columns.

As earlier stated, at contemporary semiconductor plants where fabrication of ICs is becoming more and more microstructure-oriented, there is a growing tendency that organic matter such as surfactant and organic solvent get mixed in fluorine wastewater. The reason is that as ICs go more microstructural, greater need does exist for improvement of cleaning technique and, therefore, that it is a recent practice to mix organic matter, such as surface active agents, into cleaning agents and/or etching agents in order to obtain increased cleaning effect and/or etching effect.

Therefore, it is necessary that fluorine wastewater and organic matter-mixed wastewater containing surfactant, organic solvent, etc. must be treated in economical and rational way.

However, as already mentioned, in the past, fluorine and organic matter, such as surfactant in wastewater have been treated in separate tanks. More specifically, in the above described prior art treating arrangement, two separate apparatuses are required, namely, fluorine removal apparatus and biological treatment apparatus for treatment of organic matter. Where two different treatment tanks are separately installed, the problem is that high initial cost is required.

As FIG. 17 illustrates, at production room 731 of a semiconductor plant, etching unit 737 and other production units, and organic solvent utilization unit 732 are installed in large numbers. Along with recent trend that the fabrication of ICs is becoming more microstructure-oriented, it is now general practice that organic matter, such as surface active agent, is mixed into an etching agent which contains fluorine, and/or that chemicals containing an organic solvent are used in cleaning and drying operations. Therefore, in mixed types of wastewater which contain these chemicals (fluorine and organic substances, such as surfactant and organic solvents), organic substances present in wastewater are on the increase with time in quantity.

However, with prior art fluorine removal devices shown in FIGS. 15 and 16, and another prior art fluorine removal device 770 shown in FIG. 17, the problem is that such device, itself alone, is almost incapable of dealing with organic matter, such as surfactant and organic solvents.

The reason is that any of the prior art fluorine removal devices is unfit for microbial propagation and has no function to perform biological treatment, the device being operated in such a condition that no effect could be expected of the device for treatment of organic matter such as surfactant and organic solvents.

With reference to hydrogen peroxide wastewater, there is also a growing tendency that, at contemporary semiconductor plants, organic substances, such as surface active agents and organic solvents, mix into such wastewater. In view of the fact that microstructure-oriented IC production becomes more and more prominent, it is necessary to improve the cleaning technique accordingly. As such, there is a growing need for rational treatment of organic matter-mixed hydrogen peroxide wastewater of the kind generated at production room 1031 of a semiconductor plant as shown in FIG. 18, that is, hydrogen peroxide wastewater containing organic substances, such as surface active agents and organic solvents.

However, as already mentioned, it has hitherto been common practice that hydrogen peroxide is exclusively treated in one decomposition tank (hydrogen peroxide removal unit 1070) in which the hydrogen peroxide is catalytically decomposed with activated carbon into water and oxygen gas. Meanwhile, organic matter, such as surface active agent and organic solvent, are biologically treated alone, or subjected to physical adsorption treatment in an activated carbon adsorption column. Anyway, organic substances, such as surface active agent and organic solvent, in wastewater are treated separately from hydrogen peroxide. Therefore, two types of apparatuses are required, namely, apparatus for removal of hydrogen peroxide and apparatus for biological treatment of organic substances. This involves the problem of high initial cost.

As FIG. 18 illustrates, at production room 1031 of a semiconductor plant, there are present production related units including RCA cleaning unit 1037, and organic solvent utilization unit 1032 in large numbers. Further, for the convenience of productive operations, hydrogen peroxide and other chemicals containing organic matter, such as surfactant and organic solvent, are used for cleaning purposes. Therefore, production room 1031 generates wastewater of the sort in which hydrogen peroxide and organic matter, such as surfactant and organic solvent, are mixed together.

However, the above described conventional hydrogen peroxide removal unit 1070 involves the problem that it is almost incapable of independently performing the task of treating organic matter, such as surfactant and organic solvent. The reason is that the hydrogen peroxide removal unit 1070 does not permit propagation of microorganisms on the granular activated carbon because of the sterilizing action of hydrogen peroxide and, therefore, cannot be utilized for microbial treatment through propagation of microorganisms on the activated carbon.

SUMMARY OF THE INVENTION

Therefore, it is an object of the present invention to provide a method and apparatus for wastewater treatment which enable efficient and rational treatment in one tank of wastewater containing organic matter and, in addition, fluorine and/or hydrogen peroxide.

In order to achieve the aforementioned object, the present invention provides a method for wastewater treatment comprising providing in a same tank a fluidization zone for fluidizing a reactive filler and an immobilization zone in which an immobilizing carrier for microorganisms is fixed; causing wastewater to flow into the fluidization zone; and circulating the wastewater between the fluidization zone and the immobilization zone to treat the wastewater through chemical reaction of the reactive filler in the fluidization zone and to treat the wastewater in the immobilization zone by microorganisms propagated therein.

According to the wastewater treatment method of the invention, the reactive filler is fluidized in the fluidization zone so that the reactive filler can perform active chemical reaction whereby the wastewater is allowed to undergo efficient chemical treatment.

Since the wastewater is circulated between the fluidization zone and the immobilization zone, microorganisms generated in the fluidization zone are introduced into the immobilization zone, which results in effective microbial propagation on the immobilizing carrier fixed in the immobilization zone. Thus, organic substances in the wastewater are biologically treated by such microorganisms.

According to the invention, therefore, organic matter-containing wastewater is highly efficiently treated through both chemical reaction and microbial action.

In one embodiment, the immobilizing carrier is comprised of same material as the reactive filler.

According to this embodiment, organic substances in the wastewater are biologically treated by microorganisms propagated on the fixed carrier and, in addition, the wastewater is chemically treated. This provides for good improvement in treatment efficiency.

In one embodiment, the rate of circulation of the wastewater is varied according to the concentration of treated water discharged from the tank.

According to this embodiment, the wastewater is effectively treated to the desired quality level.

The present invention also provides a method for wastewater treatment comprising: introducing wastewater into a preparatory stage acid water tank under acid injection and fluidizing a reactive filler in the acid water tank; defining a fluidization zone for fluidizing a reactive filler in the wastewater from the acid water tank and an immobilization zone for immobilizing a reactive filler in the wastewater; and circulating the wastewater between the fluidization zone and the immobilization zone to treat the wastewater through chemical reaction of the reactive filler in the fluidization zone and to treat the wastewater in the immobilization zone by microorganisms propagated on the reactive filler therein.

According to the wastewater treatment method of the invention, first in the preparatory stage acid tank, target substance (fluorine) in the wastewater is caused to come into vigorous chemical reaction with the reactive filler in the presence of acid thereby to reduce the target substance in the wastewater.

Subsequently, the water is subjected to efficient chemical treatment through vigorous chemical reaction of the reactive filler fluidized in the fluidization zone. Furthermore, microorganisms developed in the fluidization zone are introduced into the immobilization zone and are effectively propagated on the reactive filler immobilized in the immobilization zone. Organic matter in the wastewater is biologically treated by the microorganisms.

Therefore, according to this invention, high concentration fluorine wastewater that contains organic matter is first treated by vigorous chemical reactions caused in the acid tank in which reactive filler is fluidized in the presence of acid. Then, the wastewater is efficiently treated through both chemical reaction of the reactive filler in the fluidization zone and microbial action of microorganisms on the reactive filler in the immobilization zone.

The present invention further provides an apparatus for wastewater treatment comprising: a first tank into which wastewater is to be introduced, said first tank including: an upper portion having a reactive filler and an aeration unit for fluidizing the reactive filler while aerating the reactive filler in the wastewater; intermediate and lower portions each having an immobilizing carrier for microbial propagation and in which microorganisms are allowed to propagate; and a circulation unit for transferring treated water that has been treated in the upper portion to the lower portion, the upper portion of the first tank being operative so that the reactive filler is fluidized through the aeration caused therein so as to treat the wastewater by chemical reaction, the intermediate and lower portions of the first tank being operative so that organic matter in the wastewater is biologically treated by the microorganisms.

Therefore, according to this invention, it is possible to utilize reaction filler of same kind for purposes of both chemical treatment and biological treatment in one tank or the first tank. Therefore, fluorine wastewater that contains organic matter is rationally treated in one tank.

Further, it is possible to three-dimensionally and efficiently treat organic matter-containing wastewater in one tank, which results in some cost saving in both initial cost and running cost.

The present invention also provides an apparatus for wastewater treatment comprising: a preparatory stage acid water tank into which wastewater is introduced under acid injection and in which a reactive filler is fluidized; and a first tank into which the wastewater is introduced from the preparatory stage acid water tank, said first tank including: an upper portion having a reactive filler and an aeration unit for fluidizing the reactive filler while aerating the reactive filler in the wastewater; intermediate and lower portions each having a non-fluidized immobilizing carrier for microbial propagation; and a circulation unit for transferring treated water that has been treated in the upper portion to the lower portion; the upper portion of the first tank being operative so that the reactive filler is fluidized through the aeration caused therein so as to treat the wastewater by chemical reaction, the intermediate and lower portions of the first tank being operative so that organic matter in the wastewater is biologically treated by microorganisms fixed to the immobilizing carrier.

According to this invention, initially, in the preparatory stage acid tank, a reactive substance (calcium ions) is forcibly eluted from the reactive filler (e.g., calcium carbonate mineral) in the presence of acid, and the eluted reactive substance is chemically reacted with the target substance (fluorine) in the wastewater, whereby the target substance (fluorine) is pretreated.

Subsequently, in the upper portion of the first tank, the reactive filler is fluidized under aeration. Accordingly, chemical reaction of the reactive filler with the wastewater is accelerated. Thus, in both the acid tank and the upper portion of the first tank, the wastewater is efficiently chemically treated through chemical reaction of the reactive substance (calcium ions) eluted from the reactive filler with the target substance.

On the other hand, reactive filler fixed as immobilizing carriers (calcium carbonate mineral) in the intermediate and lower portions allows microorganisms to propagate thereon and this makes it possible that organic substance in the wastewater is biologically treated by microorganisms so propagated and immobilized in the intermediate and lower portions in a very efficient way.

In one embodiment of the invention, the immobilizing carrier in the intermediate and lower portions each is comprised of same material as the reactive filler.

By utilizing reactive filler as immobilizing carrier for microorganisms in this way it is possible to expect effective treatment through chemical reaction in the intermediate and lower portions and to control microbial growth and propagation.

In addition, since both reactive filler and immobilizing carrier are comprised of same kind of material, it is possible to carry out the treatment either through chemical reaction or through biological reaction, or both according to the operating conditions.

In one embodiment, the upper portion includes a separator wall for separating from the wastewater the reactive filler present therein.

Therefore, treated water and microbial sludge is caused to flow away from the separator wall without reactive filler being allowed to flow away from the separator wall.

In one embodiment; the reactive fillers comprise calcium carbonate mineral.

According to this embodiment, treatment of fluorine wastewater containing organic matter is possible. Specifically, the wastewater treatment apparatus of this embodiment is such that first in the upper portion in which the calcium carbonate mineral is fluidized, fluorine in the wastewater is caused to react with the calcium carbonate mineral to form calcium fluoride. Since fluorine containing wastewater is introduced into the upper portion in which calcium carbonate mineral is fluidized, fluorine and calcium carbonate mineral can be brought into positive contact with each other for chemical reaction, with the result that calcium fluoride as a reaction product is smoothly produced. In the upper portion of the first tank, the wastewater is treated with respect to its fluorine content only so that the pH thereof goes closer to neutrality.

Next, the water under treatment is sent from the upper portion to the lower portion and is biologically treated by microorganisms immobilized to masses of calcium carbonate mineral in the lower and intermediate portions. That is, microorganisms propagated on the surface of the calcium carbonate mineral act to biologically treat organic matter, such as surfactant and organic solvent, in the wastewater.

Already in the upper portion of the first tank, the pH of the wastewater has been neutralized by the calcium carbonate mineral therein. Therefore, in the lower and intermediate portions of the tank, various kinds of microorganisms can be immobilized to and propagated on the surface of the calcium carbonate mineral held in immobilized condition in the presence of organic substances. The calcium carbonate mineral with such microorganisms propagated thereon is capable of biologically decomposing organic substances in the water under treatment.

Needless to say, microorganisms can readily become propagated on masses of calcium carbonate mineral as immobilizing carriers.

As is apparent from the above description, the lower and intermediate portions of the first tank provide improved environment for microbial growth as compared with the upper portion of the tank. This invites rapid growth and propagation of various kinds of aerobic microorganisms on masses of calcium carbonate mineral which serve as immobilizing carriers for them. Thus, organic matter such as surfactant and the like in the wastewater delivered by the circulation unit to the lower and intermediate portions are biologically treated. Where a line mixer is used to serve as the circulation unit, it is possible to circulate the wastewater in mixture with air so that favorable aerobic conditions can be maintained to enable more effective biological treatment.

It is noted that if, in the lower and intermediate portions, the wastewater is caused to flow in a rapid and vigorous fashion as in the upper portion, individual granules of calcium carbonate mineral may come in contact with and strike against one another, which would cause biofilm separation, thus preventing smooth microbial propagation. In contrast to such a case, granules of calcium carbonate mineral held in immobilized condition have little chance to contact one another and, therefore, microorganisms propagated on such mineral granules are much less liable to separate from the mineral granules. In the case where the calcium carbonate mineral is a natural product, the surface roughness of the mineral permits easier growth and propagation of various kinds of microorganisms thereon.

In one embodiment, the reactive filler comprise activated carbon.

According to this embodiment, it is possible to treat organic matter-containing hydrogen peroxide wastewater. More specifically, the wastewater treatment apparatus is such that first in the upper portion in which activated carbon is vigorously fluidized, hydrogen peroxide in the wastewater is caused to come in positive contact with activated carbon so that with the activated carbon used as a catalyst the hydrogen peroxide is smoothly decomposed into water and oxygen gas.

In the lower portion in which granules of activated carbon are immobilized, the physical adsorption capability that activated carbon inherently possesses with respect to organic matter is advantageously utilized for treatment of organic matter through adsorption. Further, with microorganisms immobilized and propagated on activated carbon granules immobilized in the lower and intermediate portions of the fist tank, organic substances such as surfactant and organic solvents in the hydrogen peroxide wastewater can be biologically treated. Where organic matter is present in such a condition that activated carbon is immobilized, it is possible to cause various kinds of organisms to be immobilized and propagated on the activated carbon. Since activated carbon is a porous material, activated carbon provides easy access thereto for growth and propagation of various kinds of microorganisms thereon. Such microorganisms grow and propagate not only on the surface of the activated carbon but also in the interior thereof. Microorganisms so propagated act to biologically treat organic matter in the wastewater, mainly surfactant and organic solvents.

In this way, in the lower and intermediate portions of the first tank, organic matter in the wastewater are adsorbed by activated carbon and, in turn, are biologically treated through decomposition by microorganisms propagated on the activated carbon.

In the lower and intermediate portions, granules of activated carbon are densely packed and, moreover, wastewater is allowed to slowly flow upward; therefore, activated carbon granules can physically adsorb organic matter such as surfactant and organic solvent. Therefore, it is also possible to decrease COD (chemical oxygen demand) and TOC (total organic carbon) values as indices for organic matter concentration in wastewater.

Organic substances physically adsorbed on activated carbon are, in turn, biologically treated through decomposition by microorganisms propagated in the interior of the activated carbon. Therefore, with respect to the function of the activated carbon, a cycle is repetitively performed such that physical adsorption of organic matter is first effected and, thereafter, the organic matter are decomposed by microorganisms propagated in the interior of the activated carbon. According to this embodiment, therefore, it is no longer necessary to carry out the practice of removing activated carbon from the tank and regenerating the same as has been usual in the prior art. Activated carbon with microorganisms propagated in the interior thereof is called "bioactivated carbon".

In one embodiment, there are provided a second tank into which is to be introduced treated water resulting from treatment of the wastewater in the first tank, the second tank including a fluorine concentration meter for measuring a concentration of fluorine in the treated water; and an aeration and circulation output control unit for controlling both an output of the aeration unit and an output of the circulation unit in the first tank according to the fluorine concentration measured by the fluorine concentration meter.

The aeration and circulation output control unit is operative to increase the quantity of air discharge from the aeration unit and the quantity of water circulation by the circulation unit when it is judged that fluorine is not properly treated. Then, in the first tank, there occurs a sharp increase in the contact aeration of calcium carbonate mineral as well as in the quantity of water circulation, and accordingly fluorine in the wastewater can be positively treated in the upper portion of the first tank.

The control unit may be set so that it is actuated when the reading of the fluorine concentration meter in the second tank has reached a preset value. The preset value may be such that it is slightly higher than a target value for the concentration of fluorine in the wastewater. Assuming that the target fluorine concentration is 5 ppm, for example, the preset value may be 8 ppm. By making value setting in this way it is possible to prevent any decrease in the quality of treated water. One typical case in which an increase occurs in the concentration of fluorine in the second tank is that microorganisms are excessively propagated on granules of calcium carbonate mineral fluidized in the upper portion of the first tank.

In one embodiment, there are a second tank into which is to be introduced treated water resulting from treatment of the wastewater in the first tank, the second tank including an oxidation-reduction potentiometer for measuring an oxidation-reduction potential of the treated water; and an aeration and circulation output control unit for controlling both an output of the aeration unit and an output of the circulation unit in the first tank according to the potential measured by the oxidation-reduction potentiometer.

Therefore, the aeration and circulation output control unit operates to increase the output of the aeration unit and that of the circulation unit in the first tank when, on the basis of an oxidation/reduction potential value obtained from the oxidation/reduction potentiometer, it is determined that the hydrogen peroxide in the wastewater has not surely been decomposed. As a result, the flow of activated carbon in the upper portion of the first tank becomes vigorous to accelerate decomposition of hydrogen peroxide through catalytic reaction. At the same time, microorganisms propagated in the lower and intermediate portions of the first tank can be prevented from being destroyed by hydrogen peroxide. Another advantage of increased output of the aeration and circulation unit is that microbial propagation on the surface of the activated carbon in the upper portion can be prevented. In case that microbial propagation should occur on the surface of activated carbon in the upper portion, catalytic function of the activated carbon is lowered and, therefore, its capability of decomposing hydrogen peroxide is lowered.

The wastewater treating apparatus of this embodiment does not involve the use of such chemicals as slaked lime and coagulants in large amounts in the fluorine treating stage. This makes it possible that the electric conductivity of treated water or a supernatant that has undergone the process of precipitation separation in the second tank can be reduced to not more than 800 μs/cm. Therefore, merely with addition of a filter unit, a water softener, and a reverse osmosis equipment, the apparatus provides treated water is recycled for use in ultrapure water production equipment.

With the prior art apparatus in which chemicals such as slaked lime and coagulating agent are used in large quantities, the conductivity of treated water obtained is very high to the tune of 1400 μs/cm or more, and this makes it impracticable to reuse the treated water in ultrapure water production equipment.

In one embodiment, there is a sludge return unit for returning sludge separated by precipitation in the second tank to the first tank.

According to this embodiment, the sludge return unit operates to return to the first tank biological sludge containing microorganisms that is precipitated in the second tank which acts as a precipitation tank. This makes it possible to increase the concentration of microorganisms in the first tank. Therefore, organic matter such as surfactant and organic solvents can be treated in a more rational way. In case where a slight amount (few ppm) of polyaluminum chloride is added into the first tank, fine reaction products of calcium fluoride can be coagulated in the second tank with little or no increase in electric conductivity. Sludge settled in the second tank contains not only biological sludge but also inorganic sludge of chemical origin.

In one embodiment, there are provided a filter unit into which treated water resulting from treatment in the second tank is to be introduced, a reverse osmosis unit, and an ultrapure water production unit into which treated water from the reverse osmosis unit is to be introduced for being made into ultrapure water.

According to this embodiment, wastewater as discharged from a semiconductor plant can be treated to the quality level of ultrapure water and, therefore, the cycle of water utilization can be completed within the semiconductor plant itself.

In one embodiment, the upper portion includes a microbial sludge agitator segment located across the separator wall; and a return unit for returning treated water from the microbial sludge agitator segment, in mixture with air, to the lower portion of the first tank in which the immobilizing carrier is fixed.

According to this embodiment, treated water that contains microorganisms, in mixture with air, is transferred to the lower portion and, as a result, the dissolved oxygen in the wastewater is increased to prompt propagation of aerobic microorganisms on masses of filler in the lower and intermediate portions so that the organic matter is rendered easier to decompose.

Wastewater from which reactive filler has been separated by the separator wall is introduced into the microbial sludge agitator. The return unit operate to return the wastewater introduced into the microbial sludge agitator segment, in mixture with air, to the lower portion. Therefore, aerobic microorganisms can be propagated under aerobic conditions in the lower portion to thereby enhance microbial treatment efficiency.

It may be considered possible that some quantity of wastewater would flow directly into the second tank, or a precipitation tank, without being biologically treated in the microbial sludge agitator segment. In that case, the quantity of circulation by the return unit may be determined judging from both the concentration of organic matter of inflow water and the organic matter concentration of treated water, thereby to ensure the attainment of the target water quality.

In one embodiment, the circulation unit include a strainer embedded in the reactive filler or immobilizing carrier of the lower portion such that under-treatment water from the upper portion is blown from the strainer into the lower portion.

According to this embodiment, a strainer is embedded in the reactive filler or immobilizing carrier. This arrangement is useful for fixing the reactive filler or immobilizing carrier and the strainer in position. Therefore, anchor driving is unnecessary for securing in position a pipe associated with the strainer and there is no danger of the tank surface being damaged. Furthermore, such arrangement permits uniform discharge from the strainer of a mixture of wastewater and air.

If the strainer is designed so that a mixture of wastewater and air is discharged through slits, the strainer is not liable to clogging even if the slits are of fine configuration.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a time chart for operation with the first, second, third, and fourth embodiments each;

FIG. 10 is a time chart for operation with the fifth, sixth, seventh, and eighth embodiments each;

DETAILED DESCRIPTION OF THE PREFERRED EMBODIMENTS

The invention will now be described in further detail with reference to various embodiments illustrated in the accompanying drawings.

FIRST EMBODIMENT

Figure 1:
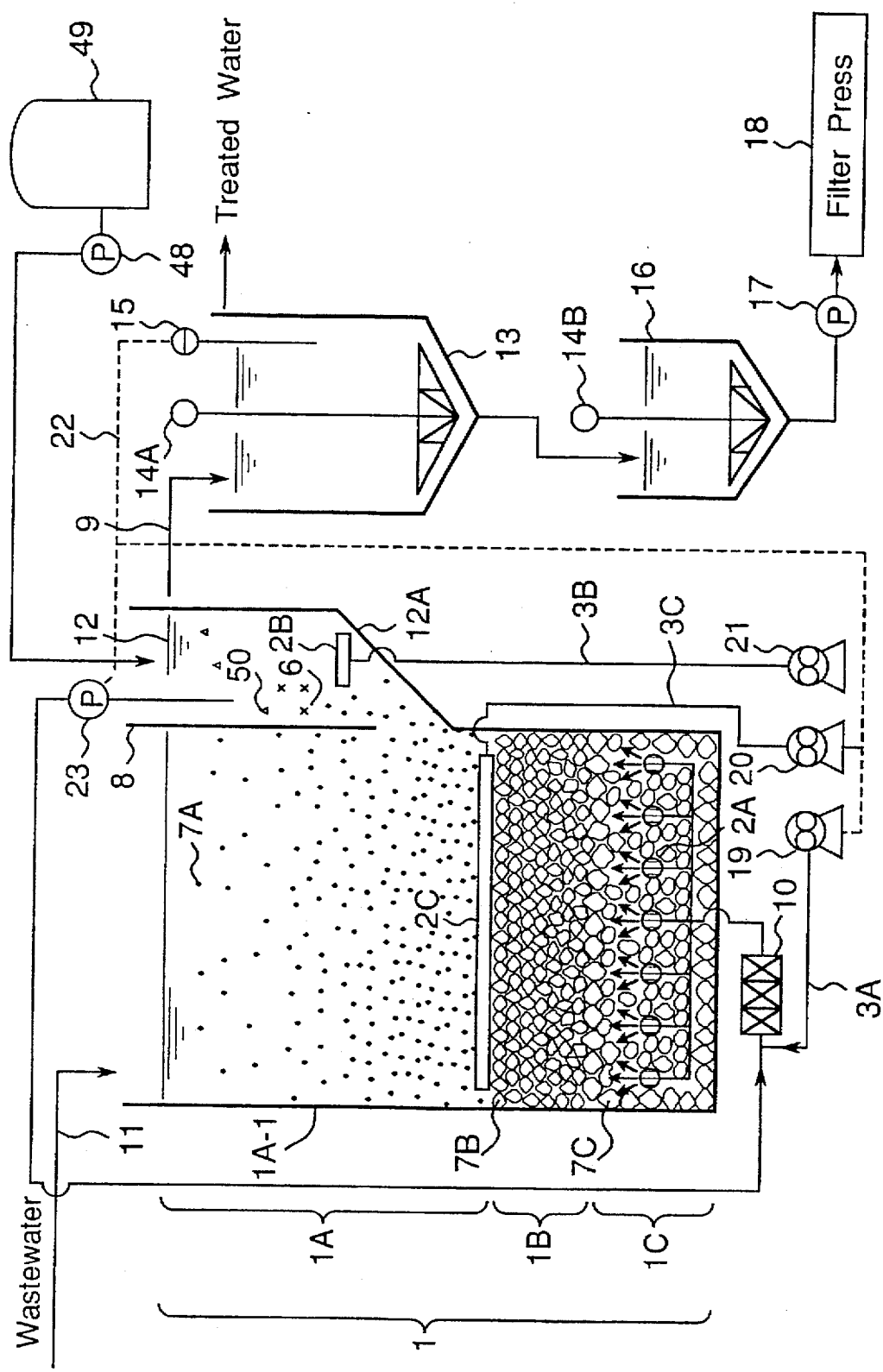
FIG. 1 is a conceptual view showing a fluorine-containing wastewater treating apparatus which represents a first embodiment of the apparatus for wastewater treatment in accordance with the invention.

FIG. 1 shows a first embodiment of the wastewater treatment apparatus in accordance with the present invention, or more specifically an apparatus for treating organic matter-containing fluorine wastewater. This first embodiment is a wastewater treating apparatus such that organic substances, such as surfactant and organic solvents, and fluorine in wastewater can be finely and rationally treated in one tank.

This wastewater treating apparatus is designed to execute two tasks, namely, removal of fluorine through the use of calcium carbonate mineral in a comparatively fluidized condition, and removal of organic matter through the use of calcium carbonate mineral in immobilized condition as an immobilizing carrier for microorganisms. Further, the apparatus is such that aforesaid two different types of treatment are carried out in one tank or a first tank 1. Therefore, this first embodiment is a breakthrough apparatus for treatment of organic matter-containing fluorine wastewater which is cost economy oriented involving low initial cost, low running cost, and low maintenance cost.

As FIG. 1 shows, the first embodiment includes a first tank 1, a second tank 13, a third tank 16, a filter press 18 which functions as a dehydrator, and a polyaluminum chloride tank 49.

The first tank 1 has an upper portion 1A, an intermediate portion 1B, and a lower portion 1C. The upper portion 1A is open upward. The upper portion 1A is adapted to receive organic matter-containing fluorine wastewater thereinto. The first tank 1 is loaded with granular calcium carbonate mineral 7A.

The upper portion 1A includes a microbial sludge agitator segment 12 which projects laterally from an upper portion body 1A-1. The upper portion body 1A-1 and the microbial sludge agitator segment 12 are partitioned by a separator wall 8 from each other, but are in communication with each other at the bottom. The microbial sludge agitator segment 12 has an inclined wall 12A which defines a bottom thereof. An aeration tube 2B is disposed adjacent the bottom of the agitator segment 12 and is connected to a third blower 21 through a pipe 3B. A microbial sludge agitator segment return pump 23 is connected to a pipe extending from the agitator segment 12 to a line mixer 10. The line mixer 10 is connected to a plurality of strainers, or diffusers 2A, 2A ..., arranged within the lower portion 1C. The diffusers 2A are buried in a package of calcium carbonate mineral 7C of larger granule size, being thereby immobilized therein. The line mixer 10 is connected to a first blower 19 by a pipe 3A.

The intermediate portion 1B, located above the lower portion 1C, is packed with medium size granules of calcium carbonate mineral 7B.

An aeration tube 2C is disposed at the bottom of the upper portion 1A which is located above the intermediate portion 1B. The aeration tube 2C is connected to a second blower 20 by a pipe 3C.

The microbial sludge agitator segment 12 is provided with a pipe extending from the polyaluminum chloride tank 49 via a fixed displacement pump 48.

An outflow pipe 9 extends horizontally from the agitator segment 12. The outflow pipe 9 bends downward at a position above the second tank 13 which corresponds to an end of the horizontal extension of the pipe 9. The second tank 13 is a precipitation tank. The second tank 13 includes a collector 14A and a fluorine concentration meter 15. The fluorine concentration meter 15 is connected by a signal transmission line 22 to the first blower 19, second blower 20, and microbial sludge agitator segment return pump 23. Respective outputs of the first blower 19, second blower 20, and return pump 23 are controlled on the basis of a signal output from the fluorine concentration meter 15 to the signal transmission line 22. Final treated water in the wastewater treating apparatus is removed from the second tank 13. A sludge pipe is connected to the bottom of the second tank 13. Sludge accumulated at the bottom of the second tank 13 is introduced into the third tank 16 after passing through the sludge pipe. The third tank 16 is a concentration tank. Connected to the bottom of the third tank 16 is another sludge pipe which, in turn, is connected to the filter press 18 through a sludge pump 17. The filter press 18 is a kind of dehydrator.

In the wastewater treating apparatus of the above described arrangement, first, organic matter-containing fluorine wastewater from a wastewater inflow pipe 11 flows into the body 1A-1 of upper portion 1A of the first tank 1 and is stirred under aeration by the aeration tube 2C while being allowed to react with the calcium carbonate mineral 7A in the meantime. Thereafter, the wastewater flows into the microbial sludge agitator segment 12. The wastewater or the water to be treated is introduced, together with microorganisms developed in the agitator segment 12, into the line mixer 10 by the microbial sludge agitator segment return pump 23.

The water to be treated is mixed in the line mixer 10 with air from the first blower 19 and is introduced uniformly into the lower portion 1C of the first tank 1, at the bottom thereof, through strainers, that is, diffusers 2A.

The diffusers 2A arranged at the bottom of lower portion 1C of the first tank 1 discharge a mixture of organic matter-containing fluorine wastewater and air. The diffusers 2A are buried in a package of large size granules of calcium carbonate mineral 7C, being thus stably secured in the lower portion 1C. Therefore, the diffusers 2A can stably and uniformly discharge such a mixture into the lower portion 1C.

In order that the diffusers 2A may be prevented from being shaken by a reaction occurring upon discharge of wastewater and air from the diffusers 2A into the lower portion 1C, the calcium carbonate mineral 7C which serves as a support is of such arrangement that it consists of comparatively large size granules of calcium carbonate mineral 7C having a diameter of 2 cm or more. The calcium carbonate mineral 7C has two functions, namely, a biological treatment function to be performed through the action of microorganisms propagated on the surface thereof, and a function to support the diffusers 2A.

Currents of mixture of water to be treated and air are discharged generally uniformly from the lower portion 1C into the intermediate portion 1B. The intermediate portion 1B is packed with medium size granules of calcium carbonate mineral 7B having a diameter range of not less that 0.5 cm but not more than 2 cm. The calcium carbonate mineral 7B allows microorganisms to propagate thereon in course of time, and functions to treat, through the action of such microorganisms, organic matter-containing wastewater in a biologically efficient manner.

Then, currents of air and wastewater as discharged from the lower portion 1C pass through the intermediate portion 1B, and flow upward from the lower portion of the upper portion 1A, so that the wastewater in the upper portion 1A is aerated and stirred, whereupon the calcium carbonate mineral 7A is fluidized.

In the first tank 1, wastewater (water to be treated) and calcium carbonate mineral 7A in the upper portion 1A are in fluidized condition under vigorous aeration by the aeration tube 2C. Meanwhile, calcium carbonate mineral packages 7B and 7C in the intermediate portion 1B and lower portion 1C are in immobilized condition, and not in fluidized condition. In the upper portion 1A, therefore, the calcium carbonate mineral 7A is kept in vigorous contact with wastewater, whereby its chemical reaction with fluorine in the wastewater is accelerated. Therefore, fluorine in the wastewater can be made into calcium fluoride through its chemical reaction with the calcium carbonate mineral 7A. The specific gravity of the calcium fluoride is smaller than that of the calcium carbonate mineral 7A and, therefore, the calcium fluoride flows from the lower portion of the upper portion 1A into the microbial sludge agitator segment 12 passing under the separator wall 8. On the other hand, granules of calcium carbonate mineral 7A having a specific gravity (2.7) larger than that of calcium fluoride gradually descend toward the lower portion of the upper portion 1A while being guided along the inclined wall 12A. In the lower portion of the upper portion 1A; the calcium carbonate mineral 7A is again brought into a fluidized condition because of aeration by the aeration tube 2C, and this serves for chemical reaction of the mineral with fluorine in the wastewater.

In the upper portion 1A, even if there should occur some microbial growth, the microorganisms grown would be separated from granules of calcium carbonate mineral 7A by air discharged from the aeration tube 2C.

Therefore, the surface of the calcium carbonate mineral 7A in fluidized condition is constantly held in adequate contact with the water under treatment, being thus allowed to go into reaction with the latter. In order to ensure reliable treatment of fluorine in the water to be treated, granules of calcium carbonate mineral having a granule diameter of not more than 0.5 mm should be selected for the calcium carbonate mineral 7A; and the detention time for wastewater in the upper portion 1A should be set to 4 hours or more.

The quantity of air to be discharged from the aeration tube 2C is preferably not less than 120 m$^3$/day per cubic meter of the capacity of the upper portion 1A. If the discharge quantity of air is less than the above mentioned lower quantity limit, the calcium carbonate mineral 7A, the specific gravity of which is 2.7, cannot be held in a positively fluidized condition. Air for discharge from the aeration tube 2C is supplied from the second blower 20 via an air feed pipe 3C.

The microbial sludge agitator segment 12 annexed to the upper portion 1A functions to separate calcium carbonate mineral 7A from microorganisms, and to cause microbial sludge 6 to be agitated by air so that the microbial sludge 6 is prevented from becoming settled. Also, by means of agitation by aeration from the aeration tube 2B, the segment 12 functions to separate a calcium fluoride of lower specific gravity, a substance formed through reaction, and an unreacted calcium carbonate of higher specific gravity from each other and, at the same time, to maintain dissolved oxygen for growth and propagation of aerobic microorganisms.

The water under treatment which is introduced by the microbial sludge agitator segment return pump 23 into the lower portion 1C has been neutralized in pH by calcium carbonate mineral 7A. Therefore, in the intermediate portion 1B, microorganisms are allowed to go into vigorous growth and propagation by utilizing organic matter in the water as a nutriment source. For the speed of upward flow of the water under treatment in the intermediate portion 1B, 1 meter per hour may be taken as a reference. This speed of upward flow is of the same order as that in an activated carbon adsorption column in the case of ordinary water treatment. Therefore, calcium carbonate mineral 7B permits sufficient microbial propagation. Depending upon the concentration of organic matter, though, microorganisms can well propagate under the condition that the upward flow velocity of the water under treatment is 1 meter per hour.

In the present embodiment, the pH of the water under treatment is adjusted in the upper portion 1A and, therefore, generation of crystal seeds of calcium fluoride which may be a cause of clogging will not occur in the intermediate portion 1B and lower portion 1C. Assuming that no pH adjustment were made in the upper portion 1A, generation of crystal seeds of calcium fluoride would occur or would not occur in the intermediate portion 1B and/or lower portion 1C depending upon the pH conditions.

The speed of upward flow of water in the intermediate portion 1B is determined by both the quantity of calcium carbonate input into the first tank 1 and the capacity of the microbial sludge agitator segment return pump 23. The quantity of calcium carbonate mineral 7B to be input into the first tank 1 may vary according to the concentration of organic matter in the water to be treated, but usually about 20% of the total capacity of the first tank 1 may be taken as a standard.

Generally, a tank into which acid wastewater is introduced has its surface treated for protection against acid and, therefore, if an anchor is driven for purposes of fixing the diffuser in position, the treated surface of the tank may be damaged, which can result in corrosion due to acid attack. In the present embodiment, therefore, the first role of the calcium carbonate mineral 7C packed in the lower portion 1C is to fix the diffusers 2A in position without damage to the interior of the tank. Treatment of organic matter in the water under treatment through propagation of microorganisms is a secondary task of the calcium carbonate mineral 7C.

For the quantity of calcium carbonate mineral 7C to be packed into the first tank 1, about 20% of the total capacity of the first tank 1 may be taken as a standard. In the upper portion 1A, the calcium carbonate mineral 7A is efficiently fluidized and agitated by bubbles discharged by the aeration tube 2C which aerates the interior of the upper portion 1A.

Quantities of air discharge from the aeration tubes 2B and 2C are separately controlled. However, there is no possibility that granules of calcium carbonate mineral 7A may flow outward from the microbial sludge agitator segment 12 because the microbial sludge agitator segment 12 has inclined wall 12A, and because the specific gravity of calcium carbonate mineral is 2.7.

Therefore, granules of calcium carbonate mineral 7A move along with bubbles in circulation within the upper portion 1A, upward from the bottom of the upper portion 1A, repeating circular flow together with wastewater within the first tank 1 time and again.

In this first embodiment, granules of calcium carbonate mineral 7A having a granule size of not more than 0.5 mm are employed as filler material. Therefore, calcium carbonate mineral 7A, as a whole, has a large surface area for reaction and can exhibit efficient reaction with fluorine in the water to be treated. In addition, calcium carbonate mineral 7A can be easily kept in equilibrium relationship with aeration by the aeration tube 2C. The term "equilibrium relationships" used here refers to a condition in which the calcium carbonate mineral 7A is constantly kept in fluidized condition by aeration without being allowed to be quickly settled.

Therefore, granules of calcium carbonate mineral 7A are held in fluidized condition over a wide range within the first tank 1. The detention time periods for the water to be treated in the upper portion 1A, intermediate portion 1B, and lower portion 1C of the first tank 1 should be determined according to both the concentration of fluorine and the concentration of organic matter, such as surface active agents, in the inflow wastewater. However, judging from the fluorine concentration range of from 30 to 300 ppm, and the COD concentration of surfactant and organic solvents on the order of few ppm, and considering relevant safety coefficient, the time of detention in the upper portion 1A is set to not less than 1 hour; and the time of detention in the intermediate portion 1B and that in the lower portion 1C are each set to not less than 30 minutes, totalling one hour. That is, the time of detention of the water in the first tank 1, exclusive of the microbial sludge agitator segment 12, is set to a total of not less than 2 hours.

Various types of calcium carbonate mineral are commercially available at different unit prices. A calcium carbonate mineral having a granule size of the order of 1.0 mm or 0.5 mm in diameter is most inexpensive, and as the granule size becomes larger, the unit price of calcium carbonate mineral becomes higher. Therefore, when factors such as reaction efficiency and cost are considered, it is preferable that the granule size of calcium carbonate mineral 7A be not more than 2 mm. If the granule size of calcium carbonate mineral 7A is larger than 2 mm, it is necessary that the time period for reaction in the first tank 1 should be more than 3 hours. Therefore, as compared with the case in which calcium carbonate mineral 7A with a granule size of 0.5 mm is employed, it is required that the first tank 1 be of a larger size, which results in increased initial cost.

When the water under treatment moves into the microbial sludge agitator segment 12 of the upper portion 1A passing under the lower edge of the separator wall 8, a larger part of the calcium carbonate mineral granules 7A is surely blocked by the separator wall 8 so that those granules are separated from the water current flowing into the agitator segment 12. Microbial sludge 6 flows out of the microbial sludge agitator segment 12 into the second tank 13 since it has a specific gravity close to 1.

The interior of the microbial sludge agitator segment 12 is lightly aerated by the aeration tube 2B. This aeration is much less vigorous as compared with vigorous aeration by the aeration tube 2C. Therefore, under such light aeration, microbial sludge 6 is fluidized, being allowed to flow out of the agitator segment 12, while on the other hand the calcium carbonate mineral 7A granules which have cleared the separator wall 8 become settled.

A trace amount (from few ppm to tens of ppm) of polyaluminum chloride from a polyaluminum chloride tank 49 is added into the microbial sludge agitator segment 12 by the fixed displacement pump 48. Addition in such a trace amount will not result in clogging by polyaluminum chloride in the intermediate portion 1B and lower portion 1C which are both immobilized zones.

Minute calcium fluoride particles that have entered the microbial sludge agitator segment 12 passing below the separator wall 8 are agglomerated by the trace amount of polyaluminum chloride into large flocs. In the present instance, the addition of polyaluminum chloride is regulated to the order of few ppm or less thereby to inhibit an increase in electric conductivity so that the water to be treated can be reutilized as raw water for supply to ultrapure water production equipment. However, in case that the water to be treated is not reutilized as raw water for supply to ultrapure water production equipment, the addition of polyaluminum chloride may be more than few ppm.

Through formation of such flocs can be produced inorganic sludge 50 of chemical nature in the microbial sludge agitator segment 12. This inorganic sludge 50 and above mentioned microbial sludge 6 have a specific gravity lower than 2.7 and closer to 1 and are therefore allowed to drift upward under light aeration for entry into the second tank 13 through the outflow pipe 9. The reason why polyaluminum chloride is added into the microbial sludge agitator segment 12 and not the second tank 13 is that the second tank 13 has no function to perform rapid stirring operation and does not enable smooth agglomeration reaction of polyaluminum chloride.

On the other hand, smaller granules of calcium carbonate mineral 7A which have passed the separator wall 8 are precipitated in the microbial sludge agitator segment 12, being then allowed to descend along the inclined wall 12A for movement toward the intermediate portion 1B. The amount of air discharge from the third blower 21 in the microbial sludge agitator segment 12 may be not more than 5 m$^3$ per day for each cubic meter of the tank capacity of the microbial sludge agitator segment 12.

Next, the water under treatment including inorganic sludge 50 and microbial sludge 6 which exit the microbial sludge agitator segment 12 for outward flow through the outflow pipe 9 is allowed to flow into the second tank 13. The second tank 13 is a precipitation tank in which the precipitation time period for the water under treatment is set to 3 hours or more. In the second tank 13, the inorganic sludge 50 and microbial sludge 6 which are precipitated in a tapered bottom portion of the tank are first collected by the collector 14A. In this second tank 13, the water under treatment is separated into inorganic sludge 50, microbial sludge 6, and supernatant.

In this first embodiment, time allowed for precipitation in the microbial sludge agitator segment 12 is set to 30 minutes. Therefore, any material having good subsidence characteristic like calcium carbonate mineral 7A involves little possibility of its flowing out of the microbial sludge agitator segment 12. Since the time allowed for precipitation (3 hours) in the second tank 13 is considerably longer than that in the microbial sludge agitator segment 12, inorganic sludge 50 and microbial sludge 6 which are not precipitated in the microbial sludge agitator segment 12 are allowed to settle in the second tank 13. The so settled inorganic sludge 50 and microbial sludge 6 are allowed to flow into the third tank (thickening tank) 16. Time for detention in the thickening tank 16 may be 10 hours or more. In this thickening tank 16, inorganic sludge 50 and microbial sludge 6 which are principally of polyaluminum chloride and/or calcium fluoride are slowly thickened in sufficient time. Both inorganic sludge 50, which originates from polyaluminum chloride; and microbial sludge 6 are less dehydratable as compared with inorganic sludge as produced conventionally through addition of such a chemical as slaked lime. Therefore, the sludge thickened in the third tank 16 is then introduced by means of the sludge pump 17 into the filter press 18. The thickened sludge is dewatered by the filter press 18. The filter press 18 is a dehydrator having comparatively good dehydration capability. In this embodiment, it is intended that dewatered cake having a moisture content of not more than 65% be obtained, which may slightly vary, however, depending upon the treating capacity of the filter press 18. The quantity of sludge produced from the filter press 18 is exceptionally smaller than that in the case of conventional method for fluorine treatment being employed in which slaked lime and flocculant are used in large quantities.

In the upper portion 1A, microorganisms grow and propagate with time on the surface of calcium carbonate mineral 7A in fluidized condition, and accordingly the fluorine removal capability of the calcium carbonate mineral 7A is lowered. When, as a result, the fluorine concentration of the wastewater under treatment becomes larger than a specified value, the fluorine concentration in meter 15 and a regulator (not shown) which are set in the second tank 13 output a signal to the signal transmission line 22. Upon receipt of this signal, the first blower 19 and second blower 20 are caused to increase the quantity of air discharge from them through inverter control. At the same time, the quantity of circulation through the microbial sludge agitator segment return pump 23 is also increased. Then, the quantities of air discharge from the aeration tube 2C and diffusers 2A are increased. Therefore, agitation and in-tank circulation through aeration in the upper portion 1A of the first tank 1 become more vigorous. As a consequence, chemical reaction between fluorine in the wastewater and the calcium carbonate mineral 7A is accelerated by both vigorous aeration and vigorous circulation, and generation of fluoride calcium is accelerated so that the concentration of fluorine in the water under treatment is lowered.

In this first embodiment, if the concentration of organic matter in fluorine wastewater is higher than usual concentration, the number of circulation cycles in the first tank 1 may be decreased as far as possible (specifically 1 cycle/(2 hours or more)), whereby the possibility of separation of microorganisms from the calcium carbonate mineral as an immobilizing carrier is eliminated so as to enable microorganisms to be propagated and carried, more densely than usual, on the calcium carbonate mineral packages 7B and 7C in the intermediate portion 1B and lower portion 1C. In this way, organic matter treating capacity of the embodiment can be increased.

In the above described first embodiment, when the quantity of air discharge from the aeration tube 2C is set to 120 m$^3$ per day for each one cubic meter of the capacity of the upper portion 1A, treatment of wastewater of usual fluorine concentration is possible, whereas with the quantity of air discharge from the aeration tube 2C set to 200 m$^3$ or more, the reaction of the calcium carbonate mineral with fluorine in the water under treatment is accelerated, resulting in improved treatment efficiency, that is, improved fluorine removal efficiency.

In box (1) of FIG. 9, there is given a timing chart in the case of low fluorine concentration in the first embodiment, and in box (2) of FIG. 9 there is given a timing chart in the case of low fluorine concentration.

As stated earlier, the quantity of microorganisms propagated in the intermediate portion 1B and lower portion 1C can be controlled according to the quantity of discharge from the microbial sludge agitator segment return pump 23. More specifically, if the quantity of discharge from the microbial sludge agitator segment return pump 23 is increased, microorganisms may be separated from the calcium carbonate mineral packages 7B and 7C, or immobilizing carriers for microorganisms, resulting in a decrease in the quantity of microorganisms in the first tank 1. On the other hand, if the quantity of discharge from the microbial sludge agitator segment return pump 23 is decreased, microorganisms are prevented from being separated from the calcium carbonate mineral packages 7B and 7C, or immobilizing carriers for microorganisms so that microorganisms can be retained on the calcium carbonate mineral packages 7B and 7C.

SECOND EMBODIMENT

Figure 2:
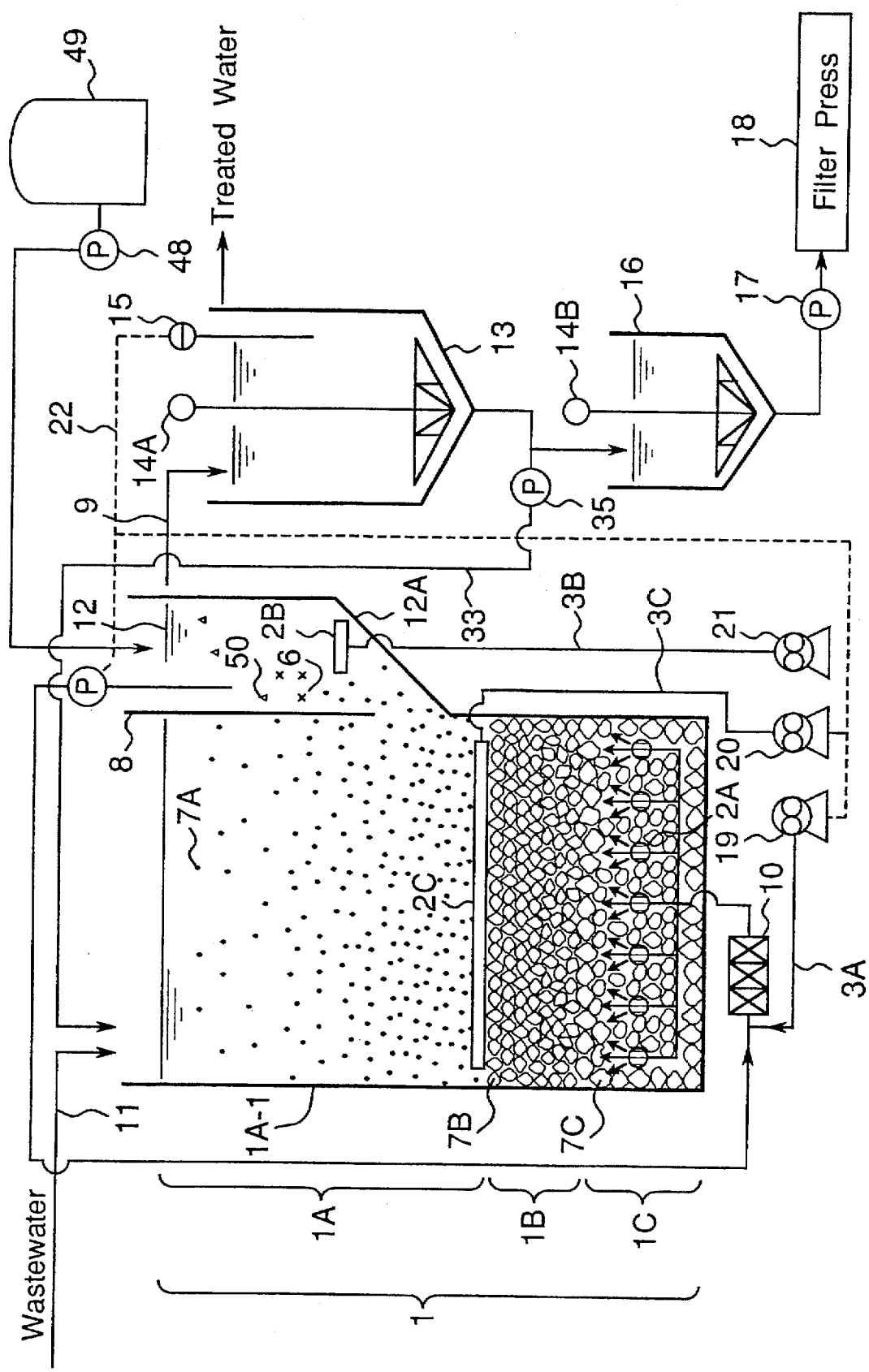
FIG. 2 is a conceptual view showing a second embodiment which is a modified form of the first embodiment.

Referring next to FIG. 2, there is shown a second embodiment of the wastewater treating apparatus in accordance with the present invention. This second embodiment differs from the first embodiment only in that the former includes a sludge return pipe 33 for returning sludge from the second tank (precipitation tank) 13 of the first embodiment as shown in FIG. 1 to the upper portion 1A of the first tank 1. Therefore, the description to follow relates mainly to the point in which the second embodiment differs from the first embodiment.

A pump 35 is attached to the sludge return pipe 33. Operating the pump 35 causes inorganic sludge 50 and microbial sludge 6 to pass through the sludge return pipe 33 for being sprayed over the surface of the wastewater in the upper portion 1A of the first tank 1. The inorganic sludge 50 returned to the upper portion 1A of the first tank 1 consists mainly of flocs of aluminum hydroxide. Therefore, the inorganic sludge 50 captures minute calcium fluoride particles and, in effect, serves for treatment of fluorine in the water under treatment. The microbial sludge 6 returned to the upper portion 1A serves for treatment of organic matter in the water.

In this way, according to this second embodiment, inorganic sludge 50 and microbial sludge 6 which are precipitated in the second tank 13 are returned to the upper portion 1A of the first tank 1 thereby to increase the thickness of the inorganic sludge and the thickness of the microbial sludge in the first tank 1. Thus, the effect of treatment with respect to fluorine and organic matter can be enhanced in a more rational way.

THIRD EMBODIMENT

Figure 3:
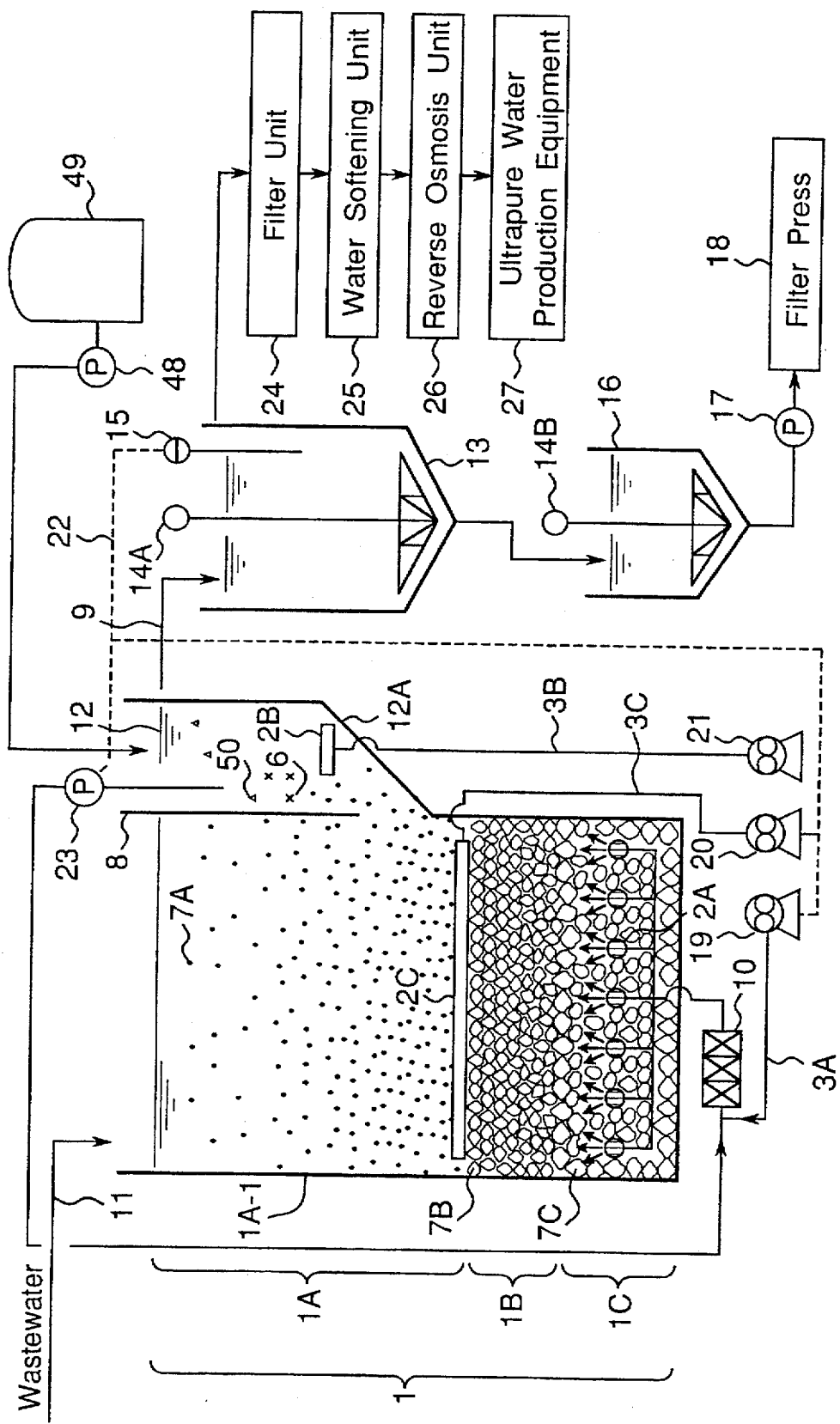
FIG. 3 is a conceptual view showing a third embodiment which is another modified form of the first embodiment.

Referring next to FIG. 3, there is shown a third embodiment of the invention. This third embodiment differs from the first embodiment shown in FIG. 1 in that it includes a filter unit 24 into which wastewater under treatment is introduced from the second tank 13, a water softening unit 25, a reverse osmosis membrane unit 26, and ultrapure water production equipment 27. Therefore the description to follow relates mainly to the points in which the third embodiment differs from the first embodiment.

The third embodiment is designed to produce ultrapure water from organic matter-containing fluorine wastewater. Wastewater under treatment from the second tank 13 which contains some suspended matter is filtered by the filter unit 24 for removal of the suspended matter. Anthracite is used as filter medium in the filter unit 24.

Then, the filtered water is treated by the water softening unit 25 so that dissolved calcium ions are mainly removed. The so treated water is then subjected to treatment by the reverse osmosis unit 26, whereby dissolved ions remaining unremoved and organic matter-containing microbial masses are positively removed.

Needless to say, the reverse osmosis unit 26 includes a conventional sterilization unit, a pH adjuster unit, and a precision filter for reverse osmosis film protection.

The reverse osmosis unit 26 provides treated water such that the water has undergone treatment with respect to pH, ions of fluorine, etc, organic matter, suspended matter, and electric conductivity. Therefore, by introducing the treated water into existing ultrapure water production equipment is it possible to produce ultrapure water.

FOURTH EMBODIMENT

Figure 4:
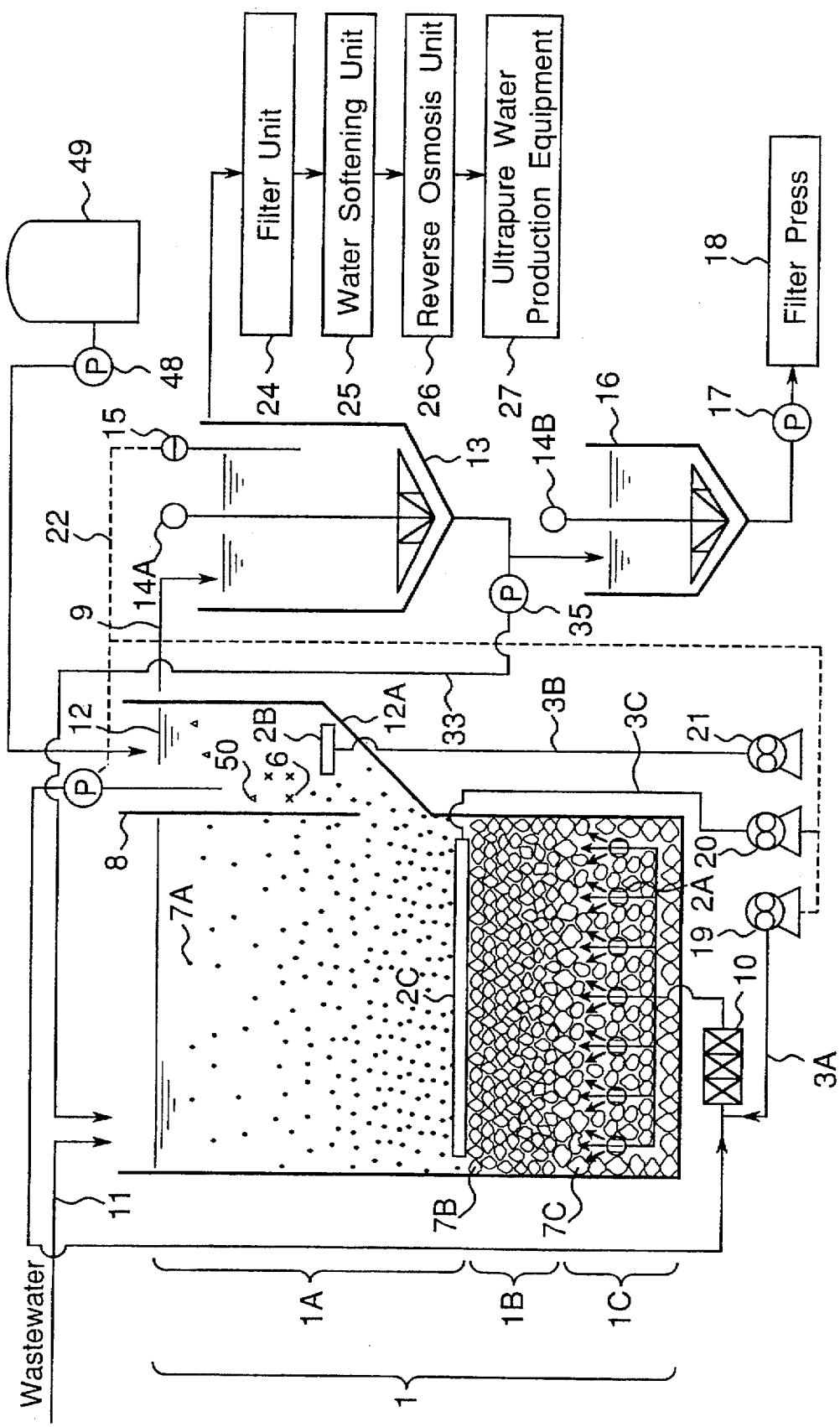
FIG. 4 is a conceptual view showing a fourth embodiment which is another modified form of the first embodiment.

Referring next to FIG. 4, there is shown a fourth embodiment. The fourth embodiment is a combined form of the second embodiment and the third embodiment. This fourth embodiment differs from the first embodiment in two points, namely, that the former includes a sludge return pipe 33 for returning sludge from the second tank 13 to the upper portion 1A of the first tank 1, and that it includes a filter unit 24 into which wastewater under treatment is introduced from the second tank 13, a water softening unit 25, a reverse osmosis membrane unit 26, and ultrapure water production equipment 27.

Therefore, the fourth embodiment provides ultrapure water in the same way as the third embodiment can. Furthermore, since the fourth embodiment, as is the case with the second embodiment, can improve the efficiency of wastewater treatment in the first tank 1 more than the first embodiment, the fourth embodiment can exhibit improved capability of ultrapure water production as compared with the third embodiment.

EXPERIMENTAL EXAMPLES

Next, one specific experimental example will be given. An experiment for treatment of organic matter-containing fluorine wastewater was carried out specifically employing an organic matter-containing fluorine wastewater treatment apparatus which represents the first embodiment shown in FIG. 1. In this apparatus, the first tank 1 had a capacity of about 1.6 $m^3$, the microbial sludge agitator segment 12 had a capacity of about 0.4 $m^3$, the second tank 13 had a capacity of about 0.4 $m^3$, and the third tank 16 (concentration tank) had a capacity of about 0.3 $m^3$.

In this experiment, treatment was carried out of wastewater containing fluorine and organic matter, such as surfactant and organic solvents which, in its condition prior to treatment, had a pH of 6.3, a fluorine concentration of 165 ppm, and a TOC of 6.5 ppm as an organic matter content. As a result of treatment by the above described apparatus, the pH of the water was changed to 7.5, the fluorine concentration was reduced to not more than 6 ppm (about one twenty-seventh of the original value), and the TOC to 1.1 ppm (about one sixth of the original value).

Another experimental example is given. An experiment for treatment of organic matter-containing fluorine wastewater was carried out employing a treating apparatus representing the third embodiment shown in FIG. 3. In this apparatus, the first tank 1 had a capacity of about 1.6 $m^3$, the microbial sludge agitator segment 12 had a capacity of about 0.4 $m^3$, the second tank 13 had a capacity of about 0.4 $m^3$, the concentration tank had a capacity of about 0.3 $m^3$, the filter unit 24 and water softening unit each had a capacity of about 0.2 $m^3$, and the reverse osmosis equipment 26 was of one-unit construction.

In this experiment, treatment was carried out of organic matter-containing fluorine wastewater which, in its condition prior to treatment, had a pH of 6.2, a fluorine concentration of 166 ppm, a TOC of 6.5 ppm as an organic matter content, and an electric conductivity of 1344 μs/cm. As a result of treatment by the above described apparatus, treated water of suitable quality for reutilization in the ultrapure water production equipment 27 was obtained such that the pH of the water was changed to 7.3, the fluorine concentration was reduced to not more than 0.5 ppm (about 1/332 of the original value), the TOC to 0.5 ppm (about 1/12 of the original value), and the electric conductivity to 264 μs/cm (about 1/5 of the original value).

Next, other embodiments of the wastewater treating apparatus of the invention, specifically for treatment of organic matter-containing hydrogen peroxide wastewater, will be described with reference to the relevant drawings.

FIFTH EMBODIMENT

Figure 5:
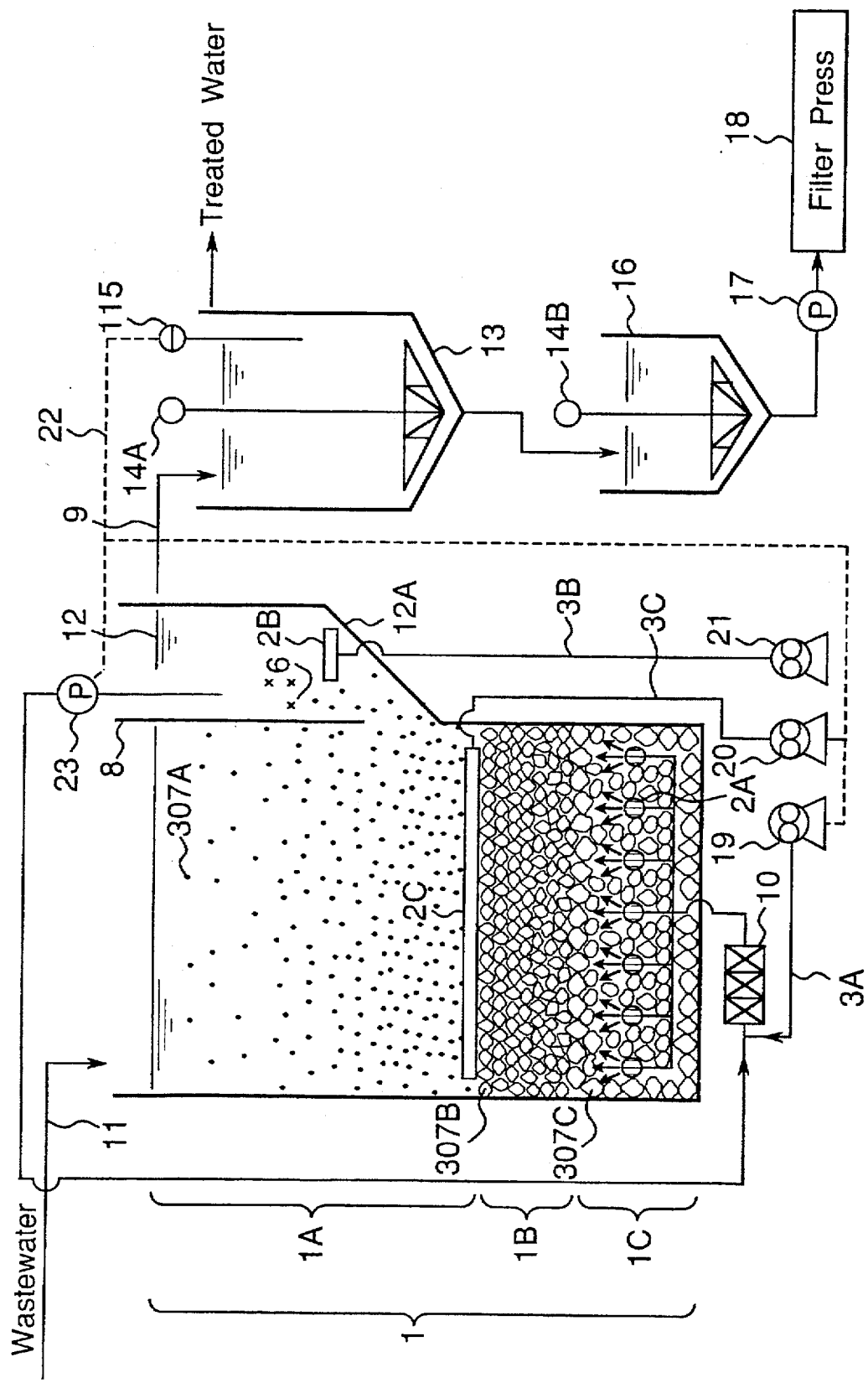
FIG. 5 is a conceptual view showing a hydrogen peroxide-containing wastewater treating apparatus which represents a fifth embodiment of the invention.

FIG. 5 shows an apparatus for treatment of organic matter-containing hydrogen peroxide wastewater which represents a fifth embodiment. This fifth embodiment is a wastewater treating apparatus such that organic matter, such as surfactant and organic solvents, and hydrogen peroxide can be finely and rationally treated in one tank.

This wastewater treating apparatus has three main features as basic concepts incorporated therein, namely, that activated carbon is used as an catalyst in a relatively fluidized condition for decomposition of hydrogen peroxide so as to be helpful for removal of hydrogen peroxide; that the adsorption capability of activated carbon in immobilized condition is utilized for adsorption of organic matter; and that activated carbon in immobilized condition is utilized as immobilizing carrier for microorganisms so as to facilitate decomposition of organic matter. These different types of treatment are carried out in one tank. Furthermore, the apparatus of the fifth embodiment is capable of treating both hydrogen peroxide and organic matter, such as surfactant and organic solvents, in a three-dimensional and rational way, as will be described hereinafter.

Therefore, this fifth embodiment only requires low cost of construction, low running cost, and low maintenance cost and is considered to be a breakthrough in the art of organic matter-containing hydrogen peroxide wastewater.

As FIG. 5 illustrates, the fifth embodiment differs from the water treatment apparatus of the first embodiment shown in FIG. 1 in four points, namely, that activated carbon 307A, 307B, 307C is packed, instead of calcium carbonate mineral 7A, 7B, 7C, in the first tank 1; that hydrogen peroxide wastewater, instead of fluorine wastewater, is introduced into the first tank; that the apparatus of the fifth embodiment does not include polyaluminum chloride tank 49; and that an oxidation-reduction potentiometer 115, instead of fluorine concentration meter 15, is provided in the second tank 13. Therefore, the fifth embodiment will be described mainly with respect to those points in which it differs from the first embodiment. Parts identical with those of the first embodiment are designated by same reference numerals.

Time periods of detention in respective tanks of the water treatment apparatus are shown in FIG. 10. In FIG. 10, box (1) shows a timing chart in the case of ordinary hydrogen peroxide concentration, and box (2) shows a timing chart in the case of lower hydrogen peroxide concentration than ordinary concentration.

In the apparatus of the fifth embodiment, hydrogen peroxide wastewater is first introduced through the wastewater inflow pipe 11 onto the water surface of the upper portion 1A of the first tank 1. The hydrogen peroxide wastewater contains organic matter. Through operation of the second blower 20, aeration air is introduced from the aeration tube 2C into the upper portion 1A. The wastewater in the upper portion 1A is aerated and stirred by the aeration air, whereupon the wastewater is brought into vigorous fluidized movement. In the first tank 1, wastewater and activated carbon 307A in the upper portion 1A are in fluidized condition because of aeration by the aeration tube 2C. On the other hand, activated carbon packages 307B and 307C are in immobilized condition.

More specifically, in the upper portion 1A, the activated carbon 307A in fluidized condition is allowed to come into frequent contact with wastewater, whereby decomposition of hydrogen peroxide in the wastewater through catalytic reaction is accelerated. Thus, hydrogen peroxide in the wastewater can be decomposed by catalytic reaction of the activated carbon 307A. Activated carbon granules 307A descend gradually toward the top portion of the intermediate portion 1B as they are guided along the inclined wall 12A. In the upper portion 1A, located above the intermediate portion 1B, because of the aeration by the aeration tube 2C, the activated carbon granules 307A are constantly held under circulated aeration by the inclined wall 12A.

After being subjected to reaction and agitation, the water under treatment flows into the microbial sludge agitator segment 12 from below the separator wall 8.

Then, the water and separated microorganisms are introduced, together with air, into the line mixer 10 by a microbial sludge agitator segment return pump 23 disposed in the microbial sludge agitator segment 12.

Subsequently, the water is introduced from line mixer 10 into lower portion 1C through diffusers 2A.

As compared with activated carbon 307A, activated carbon packages 307B and 307C in the intermediate portion 1B and lower portion 1C are larger in granule size, and therefore diffusers 2A per se are kept stable when a mixture of water and air from the line mixer 10 is discharged from diffusers 2A. The activated carbon package 307C in the lower portion 1C is in fixed condition, and water under treatment is allowed to flow upward uniformly from the diffusers 2A.

In the intermediate portion 1B and lower portion 1C, the activated carbon packages 307B and 307C are in fixed condition, and therefore microorganisms can grow and propagate comparatively easily on granules of activated carbon 307B, 307C and are immobilized thereon. Microorganisms propagated on the surface of activated carbon 307B, 307C can treat organic substances, such as surfactant and the like, included in wastewater, that is, water under treatment, through their biological reaction.

On the other hand, in the upper portion 1A, microorganisms grow on the surface of activated carbon 307A to some extent, but they are separated therefrom by air discharged from the aeration tube 2C. Therefore, activated carbon 307A and water under treatment can catalytically react sufficiently in fluidized condition. Thus, hydrogen peroxide in the wastewater is more surely decomposed into oxygen gas and water.

The quantity of air to be discharged from the aeration tube 2C is preferably not less than 60 m³/day per cubic meter of the capacity of the upper portion 1A. If the discharge quantity of air is less than the above mentioned lower quantity limit, the activated carbon 307A cannot be held in a positively fluidized condition. Air for discharge from the aeration tube 2C is supplied from the second blower 20 via an air feed pipe 3C.

With some difference involved, though, the upper portion 1A of the first tank 1 functions to perform both decomposition of hydrogen peroxide and decomposition of organic matter and, likewise, the intermediate portion 1B and lower portion 1C function to perform both decomposition of hydrogen peroxide and decomposition of organic matter. Basically, it is preferable that the capacity of the upper portion 1A be substantially equal to the combined capacity of the intermediate portion 1B and the lower portion 1C. However, in case that the organic matter content of the water under treatment is large, the combined capacity of the intermediate portion 1B and the lower portion 1C is preferably larger than the capacity of the upper portion 1A. On the other hand, in case that the hydrogen peroxide content is large, the capacity of the upper portion 1A is preferably larger than the combined capacity of the intermediate portion 1B and the lower portion 1C.

The time allowed for detention of wastewater in the upper portion 1A of the first tank 1 may be 1 hour or more during which hydrogen peroxide can be surely decomposed. In the upper portion 1A, suspended organisms are destroyed by hydrogen peroxide in the wastewater, but microorganisms present in the interior of activated carbon 307A are not completely destroyed. That is, the surface of activated carbon 307A functions as a catalyst for decomposition of hydrogen peroxide, and the interior of the activated carbon 307A functions as a "shelter for microorganisms" for microbial preservation. Therefore, in the upper portion 1A, the activated carbon 307A, while retaining microorganisms in its interior, can positively decompose hydrogen peroxide by virtue of sufficient time allowed for detention of wastewater. The water under treatment whose hydrogen peroxide has been decomposed is then introduced into the microbial sludge agitator segment 12 in which activated carbon 307A is subjected to precipitation separation, and then the water is introduced by microbial sludge agitator segment return pump 23 into the line mixer 10 in which the water is mixed with air discharged from first blower 19. Mixtures of water and air are discharged generally uniformly through diffusers 2A into the lower portion 1C.

In the intermediate portion 1B and lower portion 1C, microorganisms are allowed to go into vigorous growth and propagation utilizing organic matter in the water as a nutriment source. For the speed of upward flow of the water under treatment in the intermediate portion 1B and lower portion 1C, 1 meter per hour may be taken as a reference. This speed of upward flow is of the same order as that in an activated carbon adsorption column in the case of ordinary water treatment. Therefore, under the conditions of water upward flow at such a velocity, activated carbon 307B, 307C is of course physically capable of adsorbing organic matter and permits sufficient microbial propagation thereon. Depending upon the concentration of organic matter, though, microorganisms can, in fact, well propagate under the conditions that the upward flow velocity of the water under treatment is 1 meter per hour.

Despite the fact that activated carbon of relatively large granule size is selected for placement in the intermediate portion 1B and lower portion 1C, and that water under treatment is mixed with air, if the upward flow velocity of the water is substantially lowered from the 1 m/hr level, the activated carbon packages 307B and 307B in the intermediate portion 1B and lower portion 1C may possibly become clogged depending upon the concentration of organic matter in the water under treatment. Therefore, it is important that the upward flow velocity of water under treatment be kept at 1 m/hr in the intermediate portion 1B and lower portion 1C. The upward flow velocity of water is determined according to the total quantity of activated carbon 307B, 307C placed in position, the capacity of the microbial sludge agitator segment return pump 23, and the quantity of air discharge from the first blower 19.

Tasks of discharge air from the first blower 19 are to increase the concentration of dissolved oxygen in wastewater and to prevent the activated carbon packages 307B and 307C from becoming clogged.

For the total quantity of activated carbon 307B, 307C to be packed in the first tank 1, about 40% of the total capacity of the first tank 1 may be taken as a standard, but in any case it should be determined according to the quality of water.

Granule size of activated carbon 307A may be of the order of 1.00 mm to 2.00 mm, that of activated carbon 307B may be of the order of 4.0 mm to 6.00 mm, and that of activated carbon 307C may be of the order of 7.0 mm or more. However, these are not absolute conditions.

As earlier mentioned, it is arranged that air from the first blower 19 is discharged from within the lower portion 1C so as to prevent the activated carbon packages 307B and 307B from becoming clogged due to excessive propagation of microorganisms within the intermediate portion 1B and lower portion 1C of the first tank 1.

In the upper portion 1A, granules of activated carbon 307A are efficiently fluidized and agitated by bubbles blown from the aeration tube 2C for aerating the interior of the upper portion 1A and also by a water current created by a circulation flow from bottom to top of the microbial sludge agitator segment return pump 23. Activated carbon 307A granules so fluidized are returned to the bottom of the upper portion 1A by the inclined wall 12A, none of the granules being allowed to flow out of the microbial sludge agitator segment 12.

At individual granules of activated carbon 307A, propagation and separation of microorganisms are repetitively made in such a way that one same granule of activated carbon 307A performs decomposition of hydrogen peroxide at one time and adsorption of organic matter at other time.

The activated carbon package 307A in the upper portion 1A can be easily kept in equilibrium relationship with aeration by the aeration tube 2C. The term "equilibrium relationship" used here refers to a condition in which the activated carbon 307A is constantly kept in fluidized condition by aeration without being allowed to be quickly settled. Therefore, granules of activated carbon 307 are held in fluidized condition over a wide range within the first tank 1. In the present embodiment, granular activated carbon is adopted for use as activated carbon 307.

The detention time periods for the water to be treated in the upper portion 1A, intermediate portion 1B, and lower portion 1C of the first tank 1 should be determined according to both the concentration of hydrogen peroxide and the concentration of surfactant in the inflow wastewater. However, judging from hydrogen peroxide concentration range of from 30 to 500 ppm and the COD concentration of surfactant and organic solvents on the order of few ppm, and considering relevant safety coefficient, the time of detention in the upper portion 1A is set to not less than 1 hour; and the time of detention in the intermediate and lower portions 1B and 1C is set to not less than 1 hour. That is, the time of detention of the water in the first tank 1 is set to a total of not less than 2 hours.

Of course, in this case, the capacity of the upper portion 1A is set to be same as the total capacity of the intermediate and lower portions 1B and 1C.

Next, the water is separated from the activated carbon 307A and flows into the microbial sludge agitator segment 12 from below the separator wall 8. In this case, most activated carbon 307 granules are separated by the separator wall 8 apart from the water, but on the other hand microbial sludge 6 flows into the microbial sludge agitator segment 12 and flows upward therein.

In this way, the activated carbon 307A and the microbial sludge 6 are separated, the former from the latter, by the separator wall 8. However, the granular mass of activated carbon 307A may include some granules of such a smaller size that will enter the microbial sludge agitator segment 12 from below the separator wall 8. For example, there may be present some activated carbon 307A granules which may have changed with time into smaller size granules due to aeration and agitation. Such activated carbon 307A granules of smaller size may flow out of the microbial sludge agitator segment 12 toward the second tank 13.

Such activated carbon 307A granules of smaller size which are allowed to flow upward are pumped, together with microbial sludge 6, by the microbial sludge agitator segment return pump 23 for entry through a pipe into the line mixer 10. In the line mixer 10, water under treatment is mixed with air so that the concentration of dissolved oxygen in the water is increased to a level favorable for growth and propagation of aerobic microorganisms. The water so mixed with air is then discharged from the diffusers 2A into the lower portion 1C.

Streams of the water so discharged ascend from the lower portion 1C to the intermediate portion 1B, and then to the upper portion 1A. Thus, a circulation line for the water under treatment is defined by the microbial sludge agitator segment return pump 23.

The water under treatment, separated from activated carbon 307A granules in the microbial sludge agitator segment 12, is returned by the microbial sludge agitator segment return pump 23 via the line mixer 10 into the lower portion 1C and then into the intermediate portion 1B. In the fixed or immobilized zone, microorganisms grow and propagate on the activated carbon packages 307B and 307C therein in a rapid and accelerated manner because of the following factors: (1) that the activated carbon packages 307B and 307C are of high density; (2) that the activated carbon packages 307B and 307C are immobilized; (3) that since the wastewater has been treated with respect to its hydrogen peroxide content, microorganisms can readily propagate therein; (4) that the contact of the water with air allows inclusion of microorganisms in the water; (5) that organic matter are present which can facilitate microbial propagation; (6) that microorganisms present in the interior of granular activated carbon masses 307B and 307C come out of the interior of those granular masses as a result of their habitat having been improved; and (7) that microorganisms developed in the upper portion 1A have been introduced into the immobilization zone by the return pump 23.

It may be feared that if there should occur rapid propagation of microorganisms in the intermediate and lower portions 1B and 1C of the first tank 1, activated carbon packages in the intermediate and lower portions 1B and 1C might become partially clogged by microbial masses. However, by virtue of the circulation mechanism provided for the entire first tank and vigorous aeration by air, there is no possibility of activated carbon clogging.

On the other hand, the interior of the microbial sludge agitator segment 12 is lightly aerated by the aeration tube 2B. This aeration is much less vigorous as compared with vigorous aeration by the aeration tube 2C. Therefore, under such light aeration, microbial sludge 6 whose specific gravity is close to 1 is fluidized, being allowed to flow out of the agitator segment 12 for entry into the second tank 13, while on the other hand a majority of activated carbon granules A are settled by the separator wall 8.

Activated carbon 307A granules separated by the separator wall 8 descend along the inclined wall 12A for movement toward the bottom of the upper portion 1A. The amount of air discharge from the third blower 21 in the microbial sludge agitator segment 12 may be not more than 5 m$^3$ per day for each cubic meter of the capacity of the microbial sludge agitator segment 12.

Next, the water under treatment including microbial sludge 6 which exit the microbial sludge agitator segment 12 for outward flow through the outflow pipe 9 is allowed to flow into the second tank 13. The second tank 13 is a precipitation tank in which the precipitation time period for the water under treatment is set to 3 hours. In the second tank 13, the microbial sludge 6 as precipitated in a tapered bottom portion of the tank is collected by the collector 14A, the water being thus separated into microbial sludge 6 and a supernatant.

In this fifth embodiment, time allowed for precipitation in the microbial sludge agitator segment 12 is set to 30 minutes as indicated in FIG. 10. This time period for precipitation in the microbial sludge agitator segment 12 is substantially shorter than the time allowed for precipitation (3 hours) in the second tank 13. Therefore, any material like activated carbon 307A which has good subsidence characteristic involves little possibility, if any, of its flowing out of the microbial sludge agitator segment 12. However, microbial sludge 6 flows away from the microbial sludge agitator segment 12. In other words, the microbial sludge agitator segment 12 can surely separate microbial sludge 6 from the mixture of activated carbon 307A and microbial sludge 6 and direct the same into the outflow pipe 9.

Since the time allowed for precipitation in the second tank 13, or 3 hours, is considerably longer than that in the microbial sludge agitator segment 12, microbial sludge 6 which is not precipitated in the microbial sludge agitator segment 12 is allowed to settle in the second tank 13. The so settled microbial sludge 6 is allowed to flow into the third tank 16, or a thickening tank. Microbial sludge 6 is less dehydratable as compared with inorganic sludge as produced conventionally through addition of such a chemical as slaked lime. Therefore, the sludge thickened in the third tank 16 is then introduced by the sludge pump 17 into the filter press 18. The thickened sludge is dewatered by the filter press 18.

In this fifth embodiment, when the oxidation-reduction potential of the water under treatment within the second tank 13 goes up to a higher level than the predetermined value, a reduction potentiometer 115 and an adjustometer (not shown), both mounted in the second tank 13, output a signal to the signal transmission line 22. Upon receipt of this signal, the first and second blowers 19 and 20, and the microbial sludge agitator segment return pump 23 are caused to increase the quantity of air discharge and the quantity of water discharge respectively through inverter control. Then, the quantities of air discharge from the diffusers 2A and aeration tube 2C, as well as the quantity of water in circulation, are increased. Therefore, agitation through aeration in the upper portion 1A of the first tank 1, and agitation due to the circulation flow of water created by the microbial sludge agitator segment return pump 23 become more vigorous. As a consequence, catalytic reaction of activated carbon 307 with hydrogen peroxide in the wastewater is accelerated by both vigorous aeration and vigorous circulation, and decomposition of hydrogen peroxide is thus accelerated so that the concentration of hydrogen peroxide in the water under treatment is lowered.

Attention is called to the modes of reaction in the upper portion 1A of the first tank 1 and reaction in the intermediate and lower portions 1B and 1C. Usually, the activated carbon 307A in the upper portion 1A functions as a catalyst in the process of decomposition of hydrogen peroxide. On the other hand, the activated carbon packages 307B and 307C in the intermediate and lower portions 1B and 1C have a physical adsorption function with respect to organic matter, such as surfactant and organic solvents, and a function to act as an immobilizing carrier in microbial treatment of such organic matter.

Microorganisms grow and propagate in the course of time on the surface of activated carbon 307A in fluidized condition throughout the entire upper portion 1A of the first tank 1. Accordingly, the hydrogen peroxide removal capability of the activated carbon 307A is lowered. In this case, the hydrogen peroxide concentration of the wastewater under treatment in the precipitation tank 13 becomes larger than a specified value. As earlier stated, therefore, the quantity of air discharge from the first and second blowers 19 and 20, and the circulation flow of water created by the microbial sludge agitator segment return pump 23 are inverter-controlled so that vigorous aeration and vigorous circulation are effected. This results in separation of microorganisms grown and propagated on the surface of activated carbon 307A.

A larger part of the activated carbon 307A in the upper portion 1A of the first tank 1 can be of assistance for the purpose of decomposing hydrogen peroxide and can further accelerate decomposition of hydrogen peroxide in the upper portion 1A. In this fifth embodiment, if the concentration of organic matter in hydrogen peroxide wastewater is higher than usual, the number of circulation cycles of the water in the first tank 1 is set to not more than 1 cycle/hour to allow microorganisms to propagate more densely than usual in the activated carbon packages 307B and 307C in the intermediate and lower portions 1B and 1C, thereby enhancing the organic matter treating performance of the tank.

SIXTH EMBODIMENT

Figure 6:
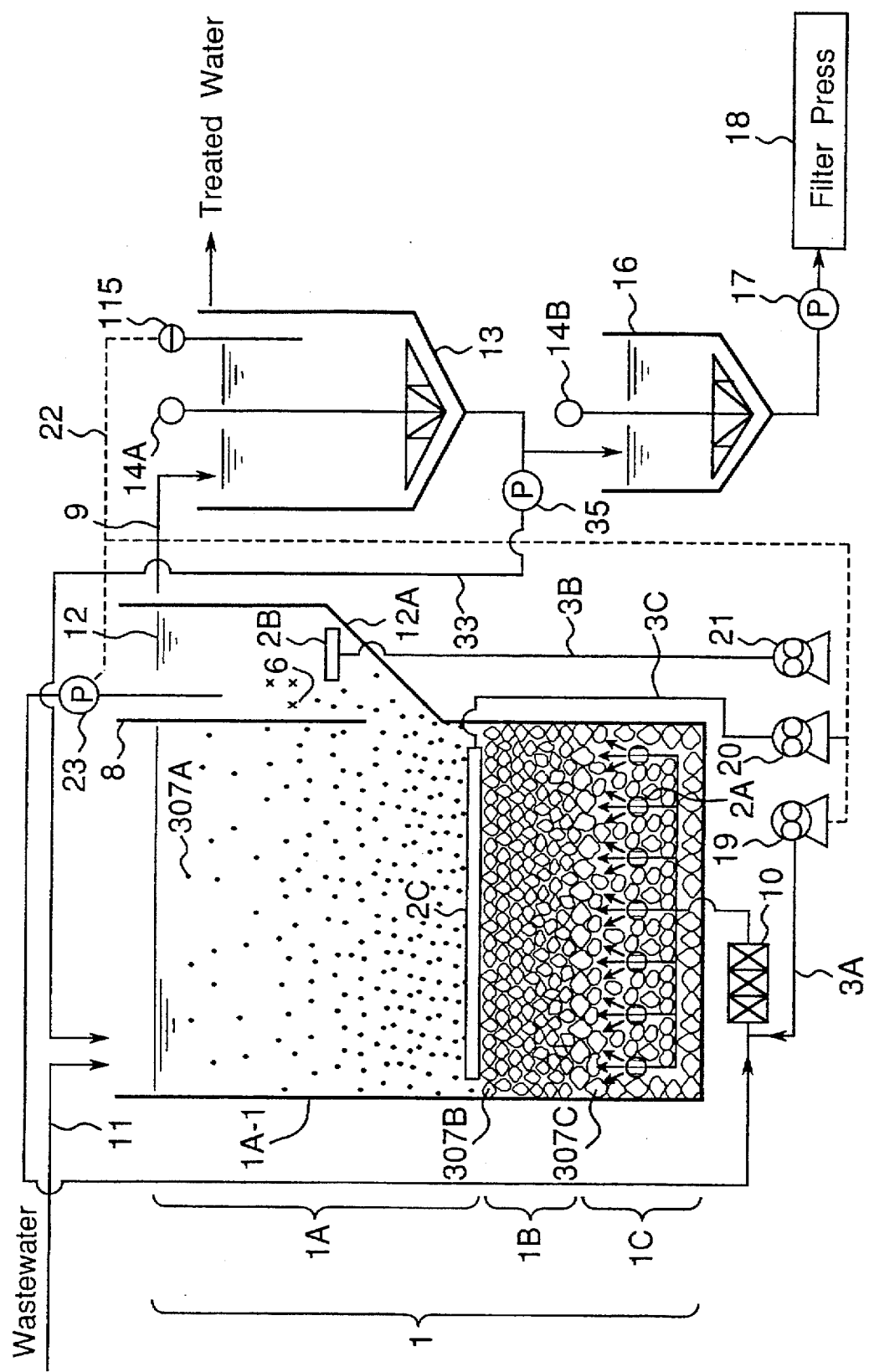
FIG. 6 is a conceptual view showing a sixth embodiment which is a modified form of the fifth embodiment.

Referring next to FIG. 6, there is shown a sixth embodiment of the invention. This sixth embodiment differs from the fifth embodiment of FIG. 5 configuration in that it includes a sludge return pipe 33 for returning sludge from the second tank 13 to the upper portion 1A of the first tank 1. Therefore, the description to follow pertains mainly to the point on which the sixth embodiment differs from the fifth embodiment.

A pump 35 is annexed to the sludge return pipe 33. Through the operation of the pump 35 the microbial sludge 6 settled in the second tank 13 is caused to pass through the sludge return pipe 33 for being sprayed over the water surface of the upper portion 1A of the first tank 1. The microbial sludge 6 returned to the upper portion 1A of the first tank 1 assists in the treatment of organic matter in the water under treatment.

In this sixth embodiment, the microbial sludge 6 settled in the second tank 13 is returned to the upper portion 1A of the first tank 1 in this way, whereby microbial concentration in the first tank 1 is enhanced to provide more rational effect of organic matter treatment.

SEVENTH EMBODIMENT

Figure 7:
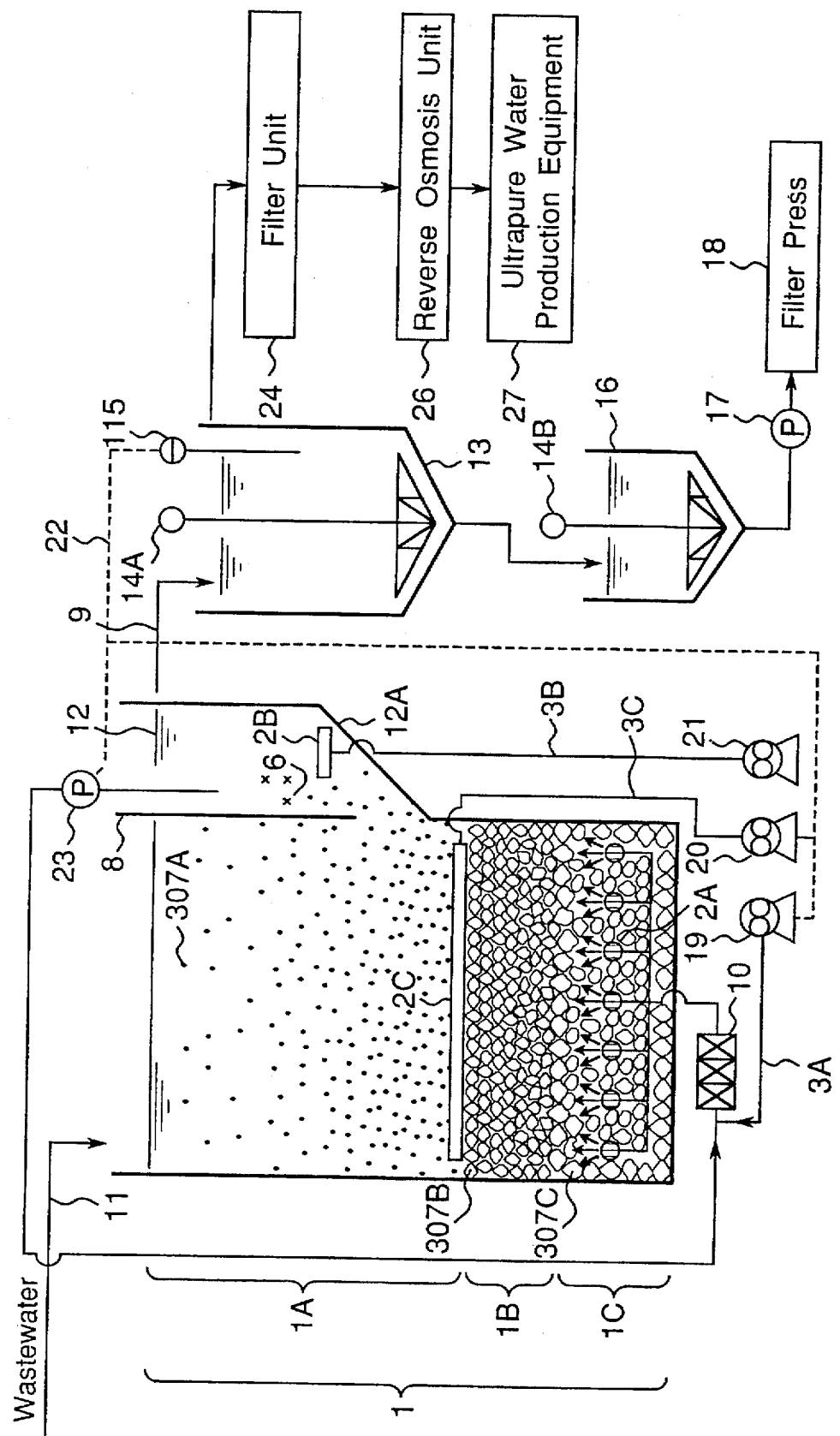
FIG. 7 is a conceptual view showing a seventh embodiment which is another modified form of the fifth embodiment.

Referring next to FIG. 7, there is shown a seventh embodiment of the wastewater treatment apparatus of the invention. The seventh embodiment differs from the fifth embodiment shown in FIG. 5 in that it includes a filter unit 24 into which the water under treatment from the second tank 13 is introduced, a reverse osmosis unit 26, and an ultrapure water production unit 27. Therefore, the description to follow pertains mainly to the points in which the seventh embodiment differs from the fifth embodiment.

The seventh embodiment is designed to produce ultrapure water from organic matter-containing hydrogen peroxide wastewater. Water under treatment from the second tank 13 that contains some suspended matter is filtered through the filter unit 24 for removal of suspended matter. Anthracite is used as filter material in the filter unit 24.

Next, the filtered in-process water is subjected to treatment by the reverse osmosis unit 26, whereby dissolved ions, organic matter, and even microorganisms present in the water are surely removed from the water. Of course, the reverse osmosis unit 26 includes a conventional sterilizing unit, a pH control unit, and a precision filter for protection of reverse osmosis membrane.

The reverse osmosis unit 26 can provide treated water that has undergone positive treatment with respect to pH, organic matter, suspended matter, electric conductivity, etc. Therefore, by introducing such treated water into any existing ultrapure water production equipment 27 it is possible to obtain ultrapure water.

EIGHTH EMBODIMENT

Figure 8:
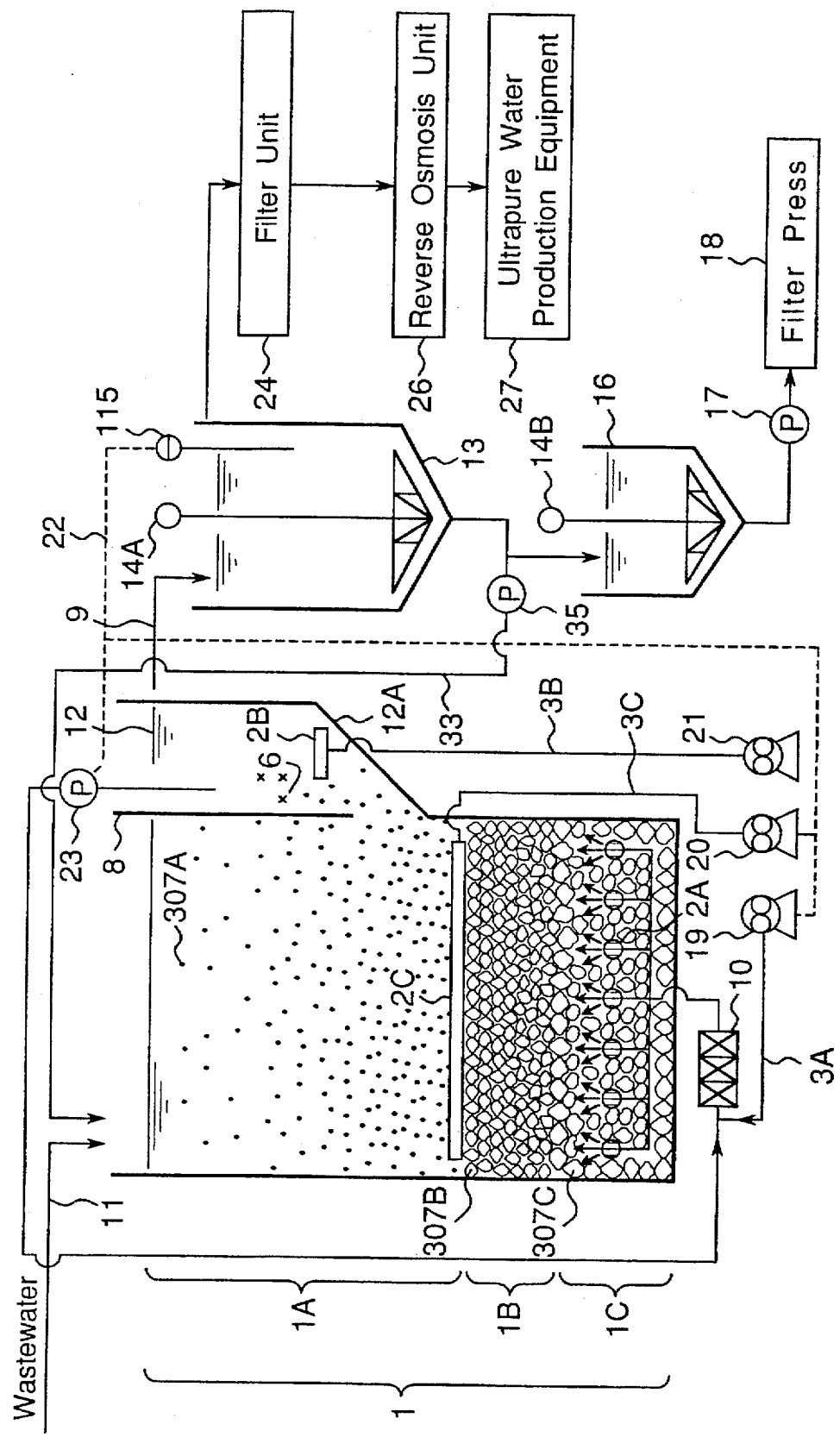
FIG. 8 is a conceptual view showing an eighth embodiment which is another modified form of the fifth embodiment.

Referring next to FIG. 8, there is shown an eighth embodiment of the invention. This eighth embodiment is designed to produce ultrapure water from organic matter-containing hydrogen peroxide wastewater.

Therefore, the description to follow pertains mainly to the points in which it differs from the sixth embodiment.

A pump 35 is annexed to the sludge return pipe 33. Through the operation of the pump 35 the microbial sludge 6 settled in the second tank 13 is caused to pass through the sludge return pipe 33 for being sprayed over the water surface of the upper portion 1A of the first tank 1. The microbial sludge 6 returned to the upper portion 1A of the first tank 1 assists in the treatment of organic matter in the water under treatment.

In this eighth embodiment, the microbial sludge 6 settled in the second tank 13 is returned to the upper portion 1A of the first tank 1 in this way, whereby microbial concentration in the first tank 1 is enhanced to provide more rational effect of organic matter treatment.

Next, the water in process is introduced into a filter unit 24 for being filtered therethrough. The filtered in-process water is subjected to treatment by the reverse osmosis unit 26, whereby dissolved ions, organic matter, and even microorganisms present in the water are surely removed from the water. Of course, the reverse osmosis unit 26 includes a conventional sterilizing unit, a pH control unit, and a precision filter for protection of reverse osmosis membrane.

The reverse osmosis unit 26 can provide treated water that has undergone positive treatment with respect to pH, organic matter, suspended matter, electric conductivity, etc. Therefore, by introducing such treated water into any existing ultrapure water production equipment 27 it is possible to obtain ultrapure water.

It is understood that the configuration of the first tank 1 in each of the first embodiment through the eighth embodiment is not limited to that shown in FIG. 1.

EXPERIMENTAL EXAMPLES

Next, one specific experimental example will be given. An organic matter-containing hydrogen peroxide wastewater treatment apparatus representing the fifth embodiment shown in FIG. 5 was employed wherein the first tank 1 had a capacity of about 1.6 m$^3$, the microbial sludge agitator segment 12 had a capacity of about 0.1 m$^3$, the precipitation tank 13 had a capacity of about 0.4 m$^3$, and the concentration tank 16 had a capacity of about 0.3 m$^3$.

In this experiment, treatment was carried out of wastewater containing hydrogen peroxide and organic matter, such as surfactant and organic solvents, which, in its condition prior to treatment, had a pH of 6.3, a hydrogen peroxide concentration of 118 ppm, and a TOC of 5.8 ppm as an organic matter content. As a result of treatment by the above described apparatus, the pH of the water was changed to 7.2, the hydrogen peroxide concentration was reduced to not more than 1 ppm, and the TOC to 1.2 ppm. That is, in this experiment, the concentration of hydrogen peroxide in the wastewater was reduced to not more than one hundredth, and the concentration of TOC to not more than one fourth.

Another experimental example is given. In this experiment, apparatus for reutilization of organic matter-containing hydrogen peroxide wastewater which represents the seventh embodiment shown in FIG. 7 was employed. In this apparatus, the first tank 1 had a capacity of about 1.6 m$^3$, the microbial sludge agitator segment 12 had a capacity of about 0.1 m$^3$, the precipitation tank 13 had a capacity of about 0.4 m$^3$, and the concentration tank 16 had a capacity of about 0.3 m$^3$. The filter unit 24 had a capacity of about 0.3 m$^3$, and the reverse osmosis equipment 26 was of one-unit construction.

In this experiment, treatment was carried out of organic matter-containing hydrogen peroxide wastewater which, in its condition prior to treatment, had a pH of 6.4, a hydrogen peroxide concentration of 132 ppm, a TOC of 6.6 ppm as an organic matter content, and an electric conductivity of 131 μs/cm. As a result of treatment by the above described apparatus, treated water of suitable quality for reutilization in the ultrapure water production equipment 27 was obtained such that the pH of the water was changed to 7.4, the hydrogen peroxide concentration was reduced to not more than 0.5 ppm, the TOC to 0.5 ppm, and the electric conductivity to not more than 20 μs/cm. In other words, according to this experiment, the hydrogen peroxide concentration was reduced to not more than $1/250$ and the TOC to not more than $1/10$.

In the above described fifth to eighth embodiments, granular activated carbon is used as reactive filler, but fibrous activated carbon may be used as such. Also, charcoal having a specific gravity of 1.0 or more may be used in place of activated carbon.

NINTH EMBODIMENT

Figure 11:
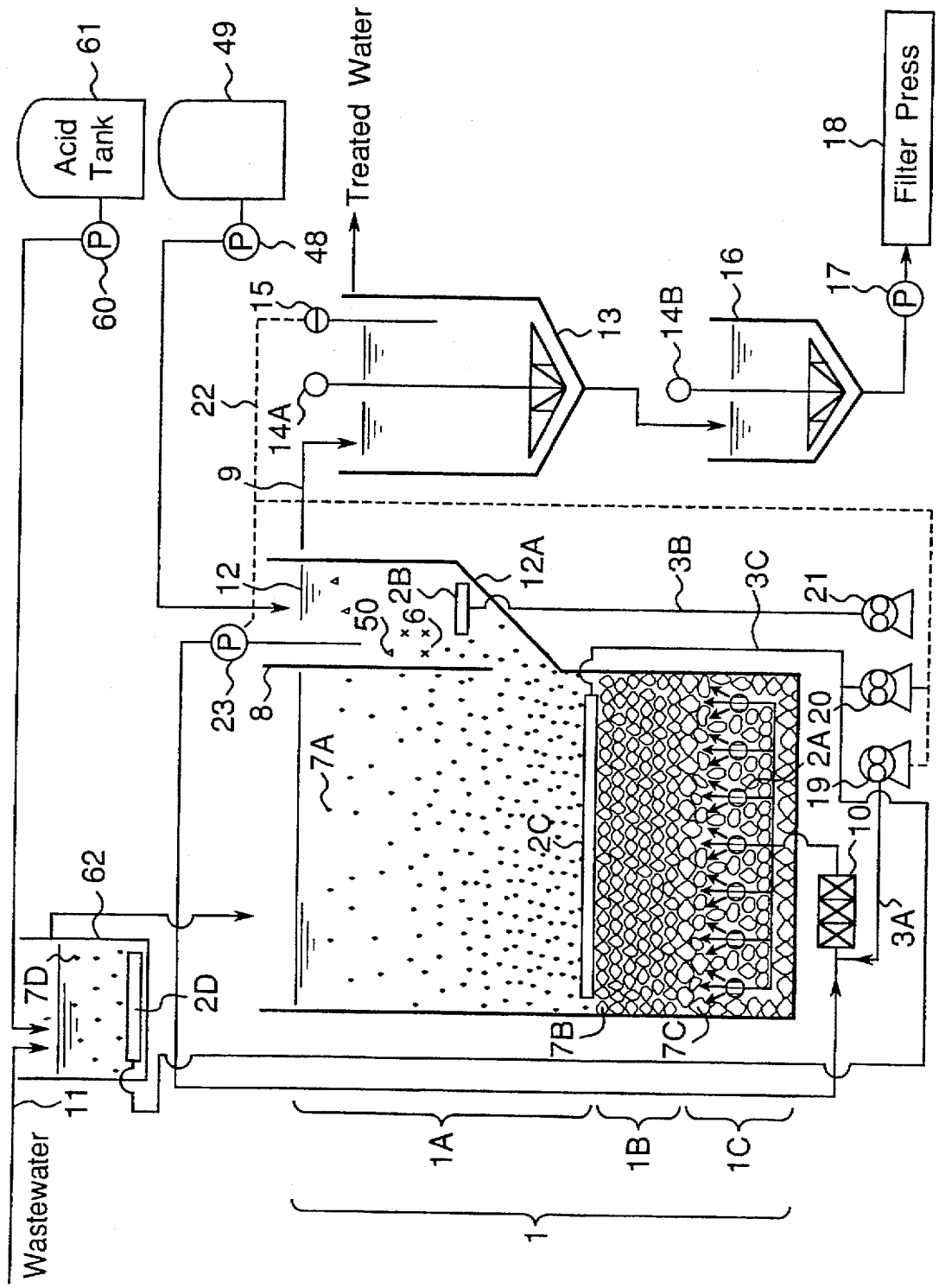
FIG. 11 is a conceptual view showing an organic matter/fluorine-containing wastewater treating apparatus which represents a ninth embodiment of the apparatus for wastewater treatment in accordance with the invention.

FIG. 11 shows an organic matter-containing fluorine wastewater treatment apparatus representing a ninth embodiment of the wastewater treatment apparatus of the invention. The wastewater treatment apparatus of this embodiment differs from the apparatus of the first embodiment in that, in an acid water tank provided for pretreatment of wastewater, calcium carbonate mineral is used as calcium material for fluorine treatment in a relatively fluidized condition and under acid injection, being thus made to serve for the purpose of pretreatment stage fluorine removal.

On the other hand, this ninth embodiment is similar to the first embodiment in that, in first tank 1, calcium carbonate mineral is used as a calcium material for treatment of fluorine in a comparatively fluidized condition and without acid injection, being thus utilized for fluorine removal; in that in the same tank, calcium carbonate mineral is utilized in immobilized condition as immobilizing carrier for microorganisms, being thus caused to serve for removal of organic matter, and in that two different types of treatment, namely, reaction for fluorine removal and reaction for organic matter removal, are carried out in one tank or first tank 1.

Therefore, as is the case with the first embodiment, this ninth embodiment involves only low initial cost, low running cost, and low maintenance cost.

In the description to follow, parts identical with those of the first embodiment are designated by like reference numerals and description of such parts is omitted. Therefore, the description pertains mainly to the points in which the ninth embodiment differs from the first embodiment.

As FIG. 11 shows, the ninth embodiment includes an acid water tank 62, a first tank 1, a second tank 13, and a third tank 16, a filter press 18 as a dehydrator, a polyaluminum chloride tank 49, and an acid tank 61.

The acid water tank 62 has provided therein an aeration tube 2D and calcium carbonate mineral granules 7D having a granule diameter of not more than 1 mm. The aeration tube 2D is connected to a second blower 20 through a pipe 3D.

Organic matter-containing high concentration fluorine wastewater flows through an inflow pipe 11 into the acid water tank 62. A supply of acid from the acid tank 61 is injected into the acid water tank 62 by an acid tank injection pump 60. The kind of acid for such injection is not particularly limited. Inasmuch as the acid is capable of eluting calcium ions from the calcium carbonate mineral granules 7D in the acid water tank 62, there is no particular limitation. In the present instance, sulfuric acid, a most common acid, is used. Nitric acid may be used, but it is not suitable for use in areas under stringent nitrogen control, because nitric acid contains a nitrogen component. Therefore, acid selection should be made in consideration of local conditions and cost economy.

Calcium ions are readily eluted from the calcium carbonate mineral granules 7D in the acid water tank 62 into which sulfuric acid has been injected. When organic matter-containing high concentration fluorine wastewater flows into the tank 62 via the inflow pipe 11, calcium fluoride is readily formed to reduce the concentration of fluorine in the wastewater.

Into the upper portion 1A is introduced the organic matter-containing fluorine wastewater that has been pretreated in the acid water tank 62. A granular mass of calcium carbonate mineral 7A is added into the first tank 1. The microbial sludge agitator segment 12, annexed to the upper portion 1A, is operative to separate microorganisms from the filler or calcium carbonate mineral 7A and agitate microbial sludge 6 with air to prevent the same from settling.

The purposes of air agitation in the microbial sludge agitator segment 12 are as stated in items (1), (2), (3) below:

(1) to prevent microbial sludge 6 from settling;

(2) to separate calcium fluoride of low specific gravity formed by reaction from unreacted calcium carbonate mineral 7A of high specific gravity; and (3) to maintain dissolved oxygen in the water in process in order to enable aerobic microbial propagation.

In the wastewater treatment apparatus, first, organic matter-containing high concentration fluorine wastewater from the wastewater inflow pipe 11 flows into the acid water tank 62 and acid is injected into the tank. The acid-injected wastewater is subjected to reaction and agitation, and then the resulting water in process is caused to flow into the upper portion 1A of the first tank 1.

After its entry into the upper portion 1A of the first tank 1, the water in process is subjected to reaction and agitation and then allowed to flow into the microbial sludge agitator segment 12. The water in process is then introduced, together with microorganisms developed, into line mixer 10 by microbial sludge agitator segment return pump 23.

The water in process is mixed with air from first blower 19 in line mixer 10, and is uniformly introduced into the bottom portion of lower portion 1C of the first tank 1 through diffusers 2A. The diffusers 2A discharge a mixture of organic matter-containing fluoride wastewater and air. The diffusers 2A are fixed in position in such a fashion that they are buried in a granular mass of calcium carbonate mineral 7C. Therefore, the diffusers 2A can uniformly discharge such a mixture into the lower portion 1C in a stable manner.

Acid wastewater, e.g., fluorine-containing wastewater, will corrode the surface of the tank through the action of its acid content. Therefore, the surface of the tank is protected by resin lining or the like against acid attack. If anchors are driven into a concrete body of the tank in order to fix diffusers in position, the resin lining surface of the tank is damaged and the so damaged spots will become corroded by the action of the acid wastewater, which may result in water leaks. Of course, it is possible to surely waterproof the anchored spots of the tank surface by applying acid resistant resin thereto after the placement of the diffusers 2A, but this is uneconomical because a considerably large number of diffusers 2A are to be set in position.

In contrast, where diffusers 2A are fixed in position by being buried in a granular mass of calcium carbonate mineral 7C as in the present embodiment, there is no danger of damage being caused to the inner surface of the tank and, therefore, such a drawback as mentioned above can be eliminated.

Into the intermediate portion 1B is discharged a mixture of water in process and air generally uniformly from the lower portion 1C. Such uniform discharge is possible because a pipe associated with the diffusers 2A is held in position horizontally along the bottom of the tank and because the diffusers 2A each have a discharge port of slit construction. The intermediate portion 1B is packed with a granule mass of calcium carbonate mineral 7B having a granule diameter of not less than 0.5 cm but not more than 2 cm. Granules of calcium carbonate mineral 7B will have microorganisms grown and propagated thereon with time, whereby the organic matter-containing water in process can be biologically treated in a very efficient manner.

The air and water in process discharged from the lower portion 1C are caused to flow upward through the intermediate portion 1B and are directed further upward from a lower portion of the upper portion 1A, and thus air for aeration is introduced into the upper portion 1A. The wastewater in the upper portion 1A is aerated and agitated by the aeration air, whereupon calcium carbonate mineral therein is fluidized.

In the first tank 1, the wastewater (water in process) and granules of calcium carbonate mineral 7A are in fluidized condition under vigorous aeration by aeration tube 2C. On the other hand, granular masses of calcium carbonate mineral 7B and 7C in the intermediate and lower portions 1B and 1C are in an immobilized condition and not in a fluidized condition.

For the calcium carbonate mineral 7D in the acid water tank 62, granules of calcium carbonate mineral having a granule diameter of not more than 1 mm should be selected, and for the calcium carbonate mineral 7A, granules of calcium carbonate mineral having a granule diameter of not more than 0.5 mm should be selected; and further the time for detention in the acid water tank 62 should be set to 0.5 hour, and the time for detention of the water in process in the upper portion 1A should be set to 1 hour or more. By so doing it is possible to positively treat the fluorine content of the wastewater.

The quantity of air to be discharged from the aeration tubes 2C and 2D is preferably not less than 120 $m^3$ per day for each 1 $m^3$ of the capacity of the upper portion 1A. If the quantity of such air discharge is smaller, it is not possible to enable heavy granules of calcium carbonate mineral 7A having a specific gravity of 2.7 to be kept in positively fluidized condition. Air discharged from the aeration tubes 2C and 2D is supplied from second blower 20 through an air feed pipe 3C.

The water in process introduced by the microbial sludge agitator segment return pump 23 into the lower portion 1C has already been neutralized in pH by calcium carbonate mineral 7A. Therefore, in the intermediate portion 1B, microorganisms can actively propagate by obtaining nourishment from organic substances in the water in process. For the velocity of upward movement of the water in the intermediate portion 1B, one meter per hour may be taken as a standard. Subject to variation depending upon the concentration of organic matter, microorganisms can propagate well indeed under the conditions of upward flow velocity of 1 meter/hour in the process of water treatment.

In this ninth embodiment, calcium carbonate mineral granules 7D having a granule size of not more than 1 mm are used as filler. Also, calcium carbonate mineral granules 7A having a granule size of not more than 0.5 mm are used as filler. Therefore, both calcium carbonate mineral 7D and calcium carbonate mineral 7A, as a whole, have a large surface area for reaction and can exhibit efficient reaction with fluorine in the water in process.

In addition, calcium carbonate mineral 7A with a granule size of not more than 0.5 mm can be easily kept in equilibrium relationship with aeration by the aeration tube 2A in the upper portion 1A. The term "equilibrium relationship" used here refers to a condition in which the calcium carbonate mineral 7A is constantly kept in fluidized condition by aeration without being allowed to be quickly settled. Therefore, granules of calcium carbonate mineral 7A are held in fluidized condition over a wide range within the first tank 1.

The time for detention of the water to be treated in the acid water tank 62 should be determined according to the quantity of acid injection, and inflow concentrations of fluorine and surfactant. Generally, in case where fluorine concentration is 700 ppm, a detention time of 0.5 hour may be taken as a standard. However, this is not an absolute condition.

Likewise, the detention time periods for the water in process in the upper portion 1A, intermediate portion 1B, and lower portion 1C of the first tank 1 should be determined according to the inflow concentrations of fluorine and surface active agents. However, since the concentration of fluorine has been reduced to the order of 30–300 ppm, and judging from the fact that the COD concentration of surfactant and organic solvents is of the order of few ppm, the time of detention in the upper portion 1A is set to not less than 1 hour considering relevant safety coefficient. The time of detention in the intermediate portion 1B and that in the lower portion 1C are each set to not less than 30 minutes, totalling one hour. That is, the time of detention of the water in process in the first tank 1, exclusive of the microbial sludge agitator segment 12, is set to a total of not less than 2 hours.

In this ninth embodiment, when the fluorine concentration of the water in process within the second tank 13 goes up higher than the predetermined value, a fluorine concentration meter 15 and an adjustometer (not shown), both mounted in the second tank 13, output a signal to the signal transmission line 22. Upon receipt of this signal, the first and second blowers 19 and 20 are caused to increase the quantity of air discharge through inverter control. Then, the quantities of air discharge from the aeration tubes 2C and 2D and diffusers 2A are increased. Then, agitation through aeration becomes more vigorous not only in the acid water tank 62, but also in the upper portion 1A of the first tank 1. As a consequence, chemical reaction of fluorine in the wastewater with calcium carbonate mineral granules 7D and 7A in the wastewater is accelerated by vigorous aeration; formation of calcium fluoride is enhanced; and thus the concentration of fluorine in the water in process is lowered.

Attention is called to the modes of reaction in the upper portion 1A of the first tank 1 and reaction in the intermediate and lower portions 1B and 1C. Usually, the upper portion 1A of the first tank 1 is in a fluidized and agitated condition due to aeration air. On the other hand, in the intermediate and lower portions 1B and 1C of the first tank 1, biological treatment is performed with respect to organic matter, such as surfactant and organic solvents. In the intermediate portion 1B and lower portion 1C, the calcium carbonate mineral 7B and calcium carbonate mineral 7C have a function to act as an immobilizing carrier in microbial treatment of such organic matter.

The timing chart for operation of the ninth embodiment is same as the timing chart for operation of the first embodiment (FIG. 9).

TENTH EMBODIMENT

Figure 12:
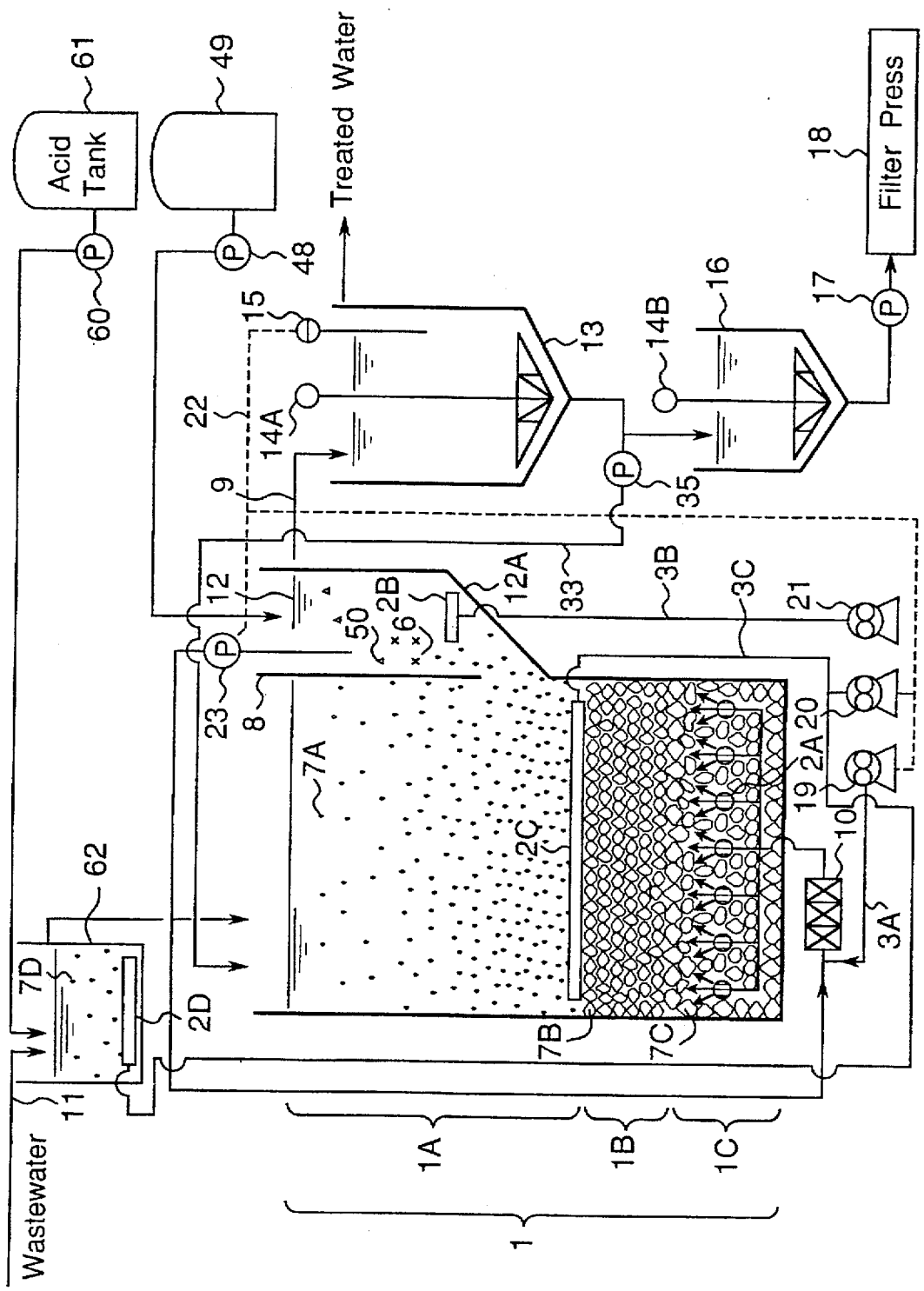
FIG. 12 is a conceptual view showing a tenth embodiment which is a modified form of the ninth embodiment.

Referring next to FIG. 12, there is shown a tenth embodiment of the wastewater treatment apparatus according to the invention. This embodiment differs from the ninth embodiment shown in FIG. 11 in that it includes a sludge return pipe 33 for returning sludge from the second tank (precipitation tank) 13 to the upper portion 1A of the first tank 1. Therefore, description of this tenth embodiment pertains mainly to the point in which it differs from the ninth embodiment.

A pump 35 is annexed to the sludge return pipe 33. By operating the pump 35, inorganic sludge 50 and microbial sludge 6 which have been settled in the second tank 13 are caused to pass through the sludge return pipe 33 for being sprayed over the surface of the wastewater in the upper portion 1A of the first tank 1. The inorganic sludge 50 returned to the upper portion 1A of the first tank 1 consists principally of aluminum hydroxide flocs and are therefore helpful for the treatment of organic matter in the water in process.

The reason why flocs of aluminum hydroxide are helpful for the purpose of treating fluorine in the water in process is that minute flocs of calcium fluoride are enclosed in larger flocs of aluminum hydroxide as if aluminum hydroxide flocs contain calcium fluoride therein. This, in effect, enables treatment of fluorine in the water in process.

Sludge in the form of aluminum hydroxide flocs enclosing calcium fluoride therein is meant by inorganic sludge 50 herein. Microbial sludge 6 returned to the upper portion 1A serves the purpose of treating organic matter in the water in process.

In this tenth embodiment, the inorganic sludge 50 and microbial sludge 6 settled in the second tank 13 are returned to the upper portion 1A of the first tank 1 as above described, whereby inorganic sludge concentration and microbial concentration in the first tank 1 are increased to provide more rational effect of fluorine and organic matter treatment.

ELEVENTH EMBODIMENT

Figure 13:
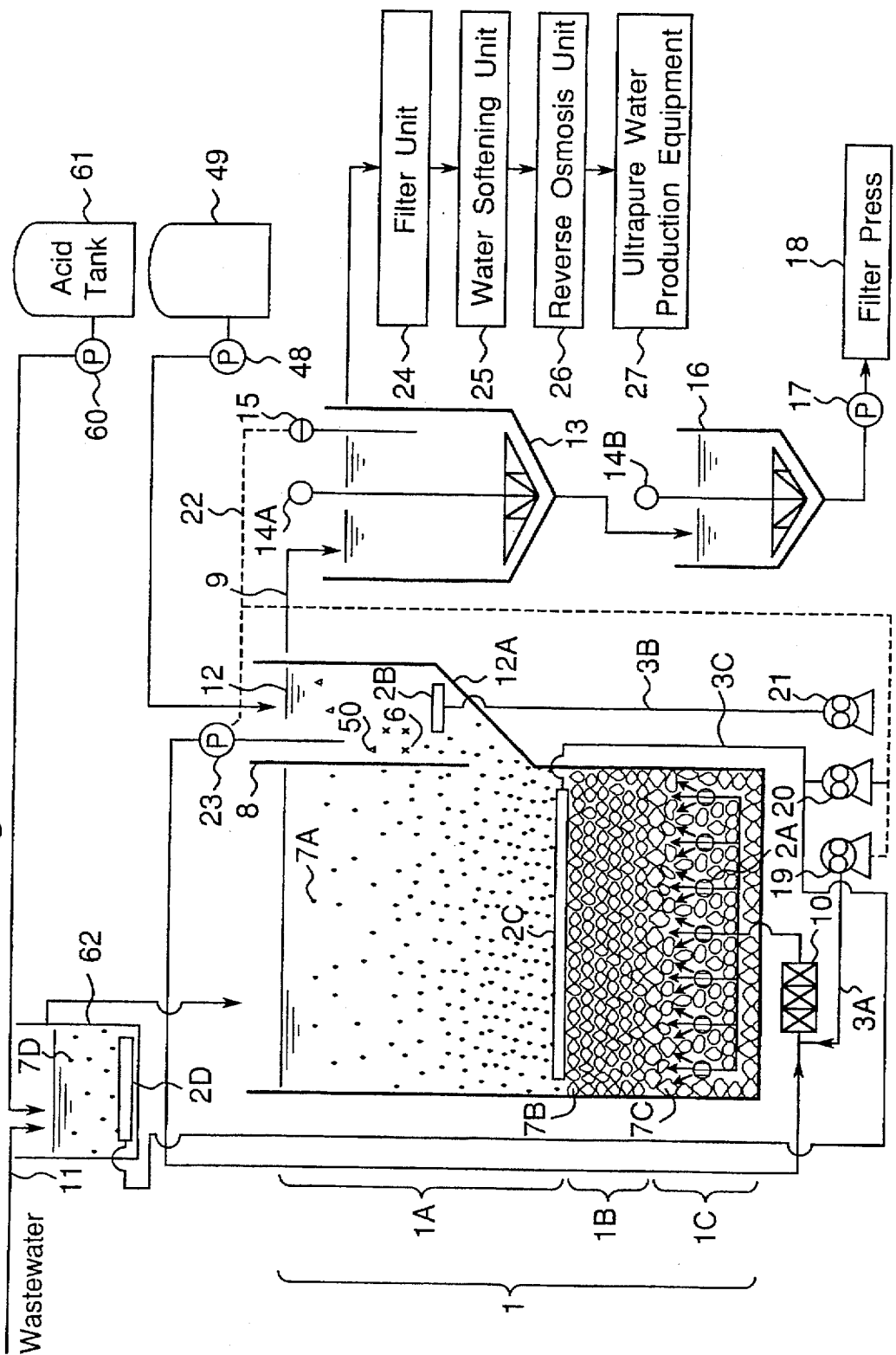
FIG. 13 is a conceptual view showing an eleventh embodiment which is another modified form of the ninth embodiment.

Referring next to FIG. 13, there is shown an eleventh embodiment of the wastewater treatment apparatus of the invention. This embodiment differs from the ninth embodiment shown in FIG. 11 in that it includes a filter unit 24 into which the water under treatment from the second tank 13 is introduced, a water softening unit 25, a reverse osmosis unit 26, and an ultrapure water production unit 27. Therefore, the description to follow pertains mainly to the points in which the eleventh embodiment differs from the ninth embodiment shown in FIG. 11.

The eleventh embodiment is designed to produce ultrapure water from organic matter-containing fluorine wastewater. Water under treatment from the second tank 13 that contains some suspended matter is filtered through the filter unit 24 for removal of suspended matter. Anthracite is used as filter material in the filter unit 24.

Next, the filtered in-process water is subjected to treatment by the water softening unit 25, whereby dissolved calcium ions are mainly removed. Further, the water is subjected to treatment by the reverse osmosis unit 26, whereby remaining dissolved ions, organic matter, and even microorganisms present in the water are surely removed from the water.

Of course, the reverse osmosis unit 26 includes a conventional sterilizing unit, a pH control unit, and a precision filter for protection of reverse osmosis membrane.

The reverse osmosis unit 26 can provide treated water that has undergone positive treatment with respect to pH, fluorine ions and the like, organic matter, suspended matter, electric conductivity, etc. Therefore, by introducing such treated water into any existing ultrapure water production equipment 27 it is possible to obtain ultrapure water.

TWELFTH EMBODIMENT

Figure 14:
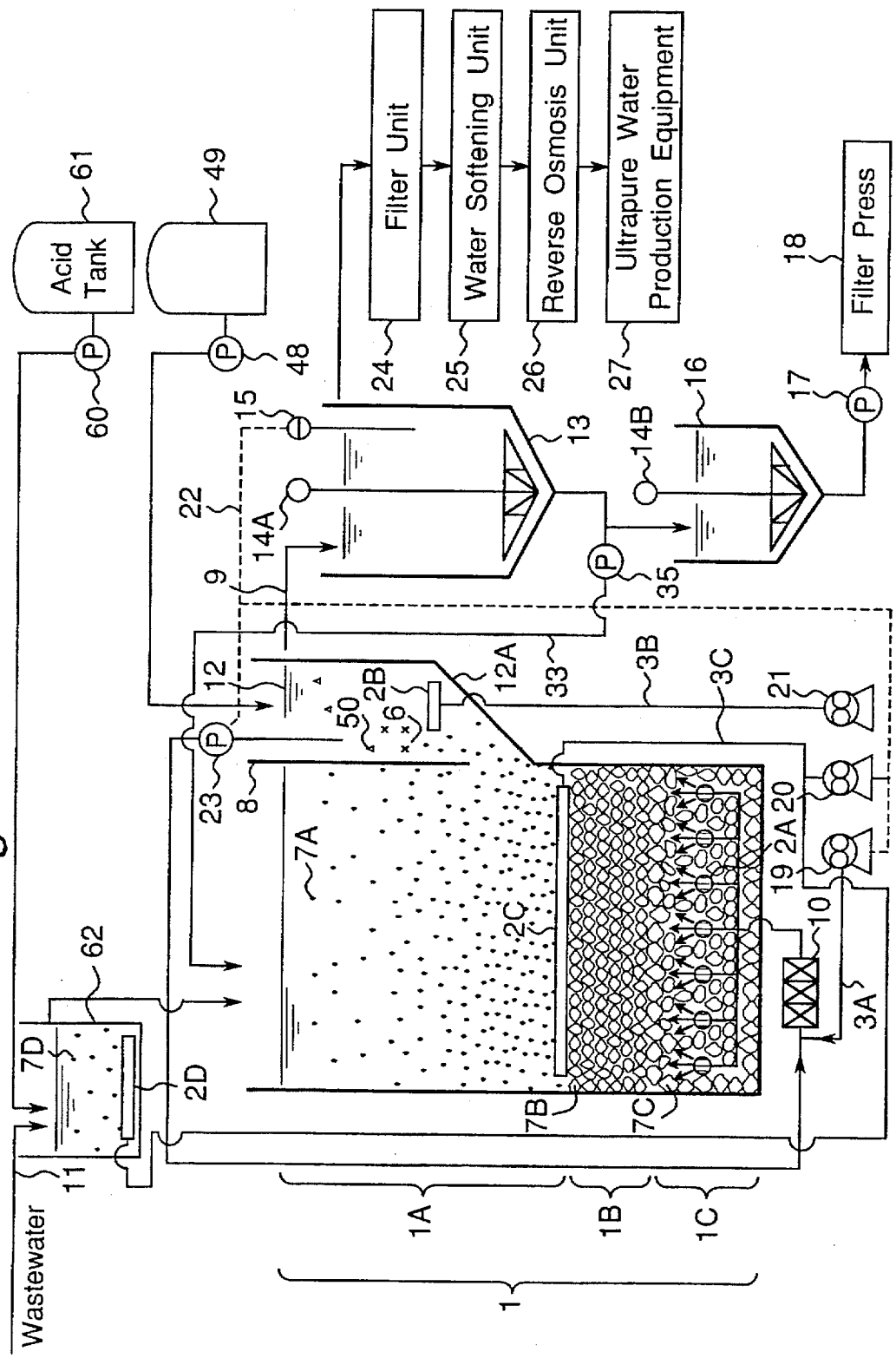
FIG. 14 is a conceptual view showing a twelfth embodiment which is another modified form of the ninth embodiment.
Figure 15:
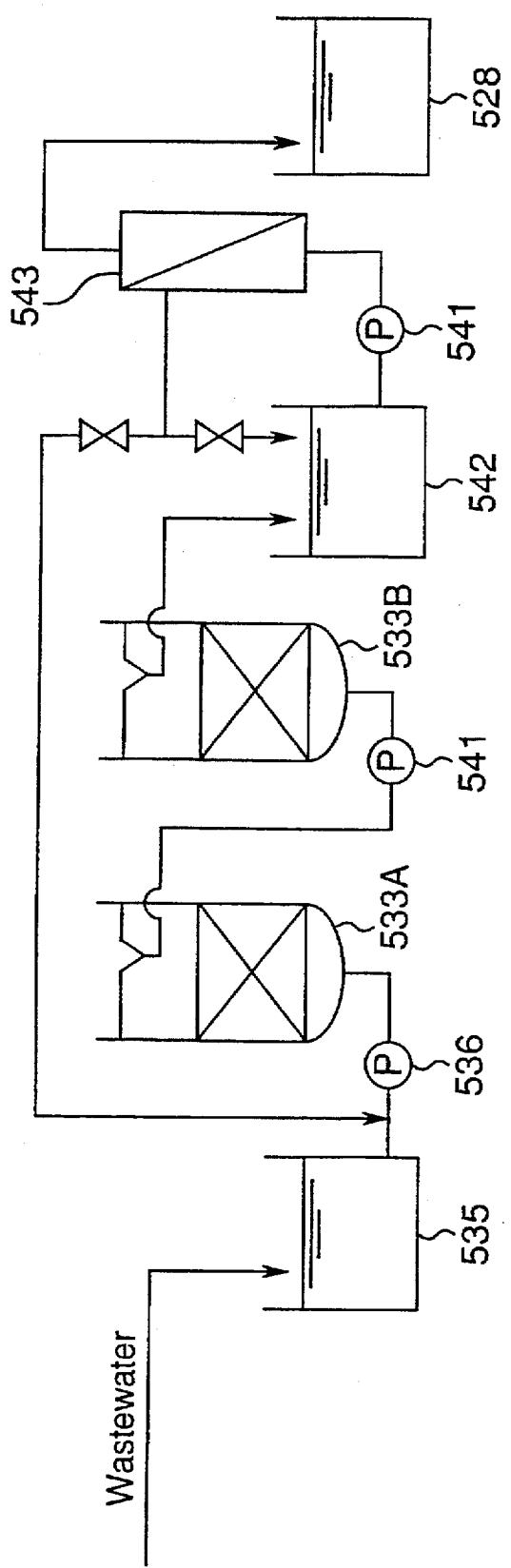
FIG. 15 is a conceptual view showing a conventional fluorine-containing wastewater treating apparatus.
Figure 16:
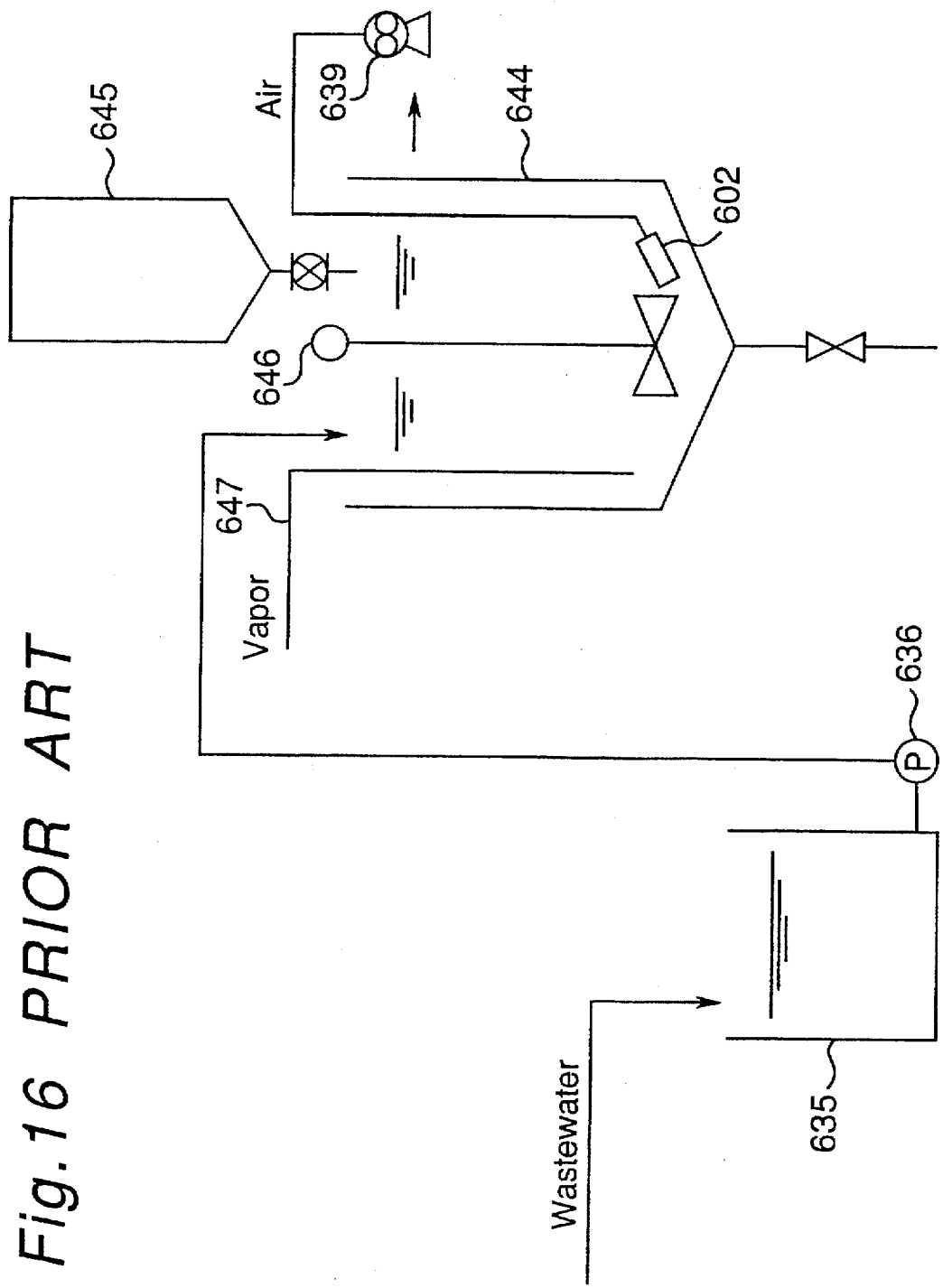
FIG. 16 is a conceptual view showing another prior-art apparatus.
Figure 17:
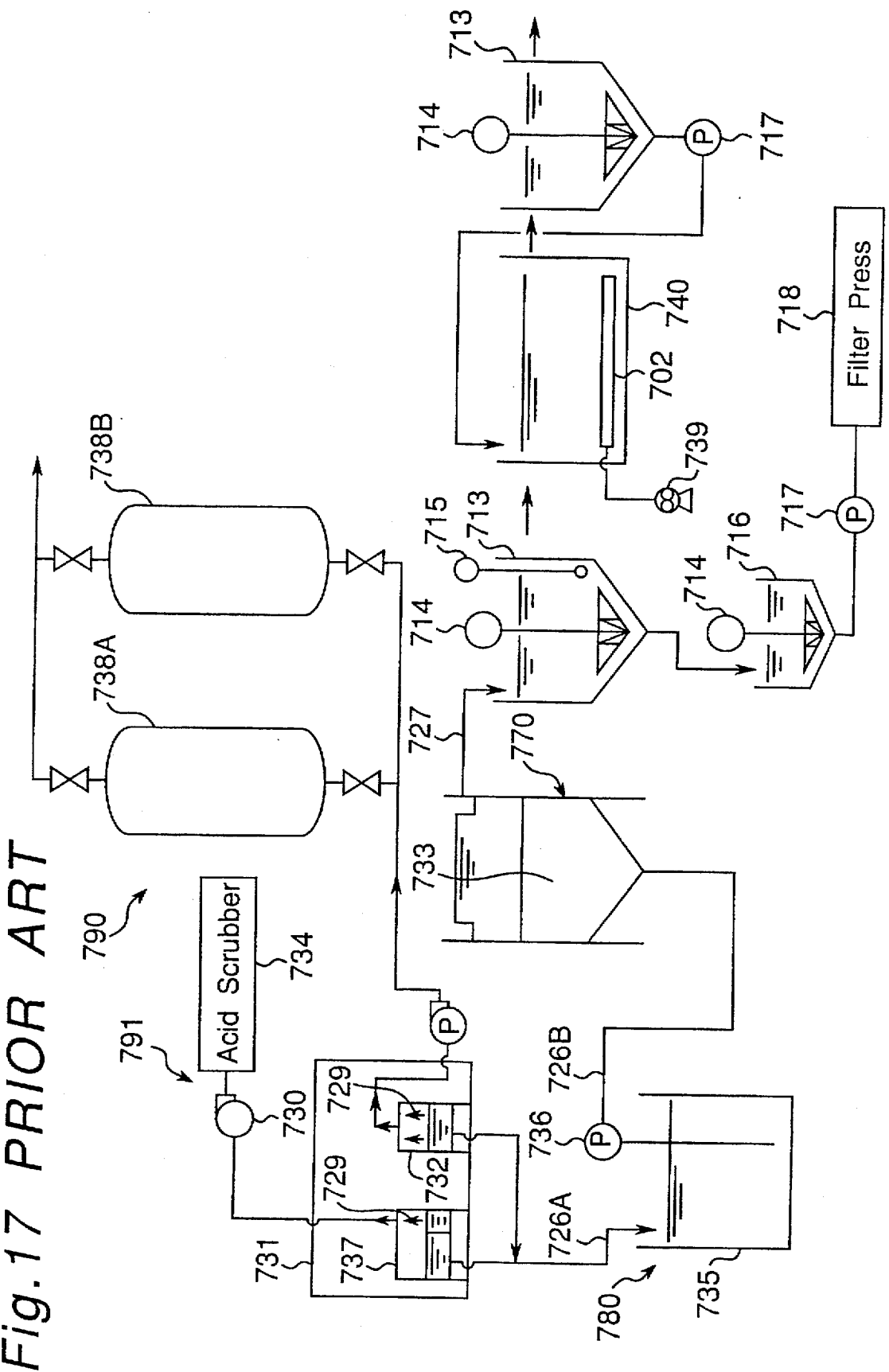
FIG. 17 is a conceptual view showing a prior art arrangement of a wastewater treatment system and an exhaust gas treatment system.
Figure 18:
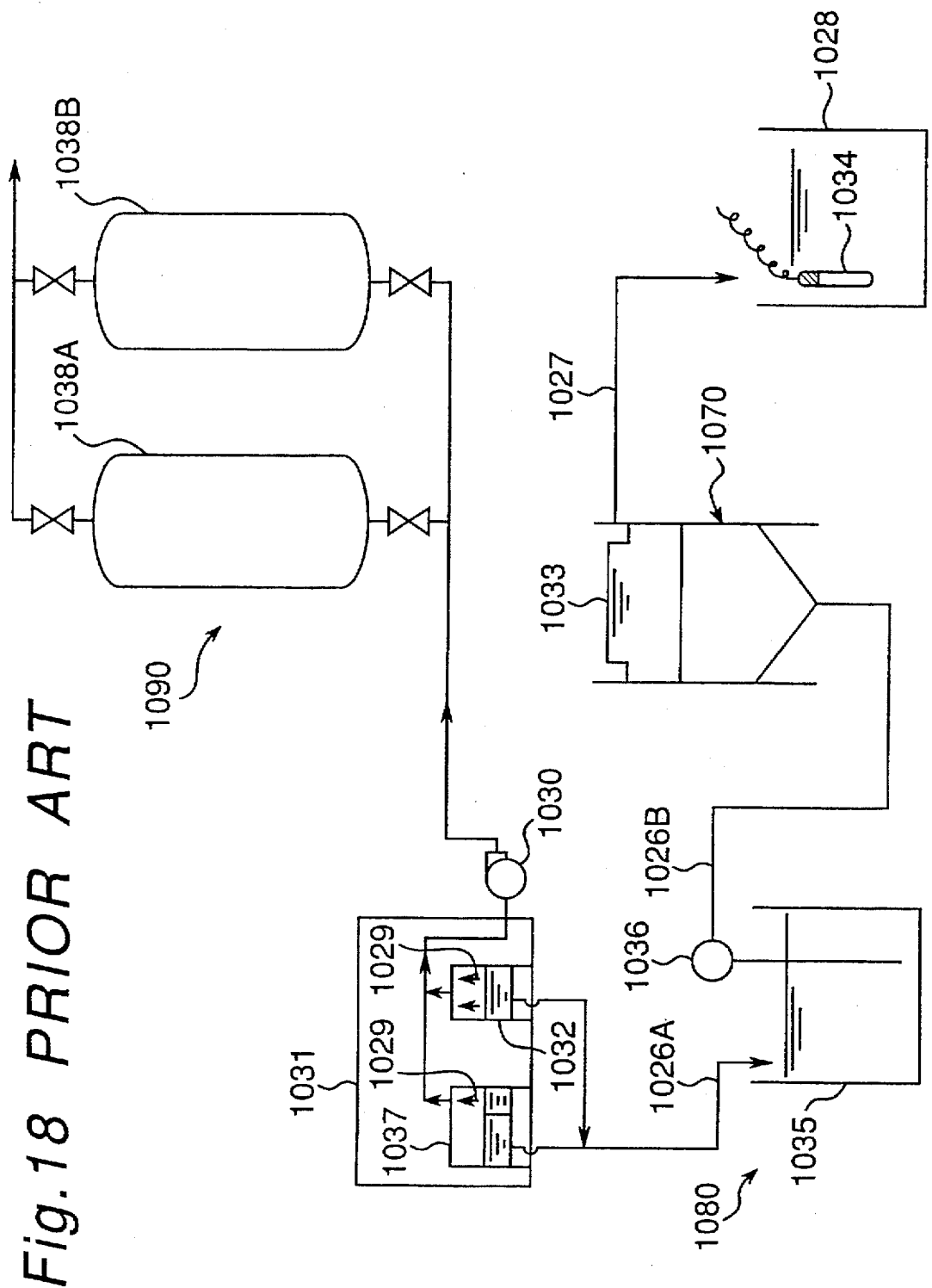
FIG. 18 is a conceptual view showing another prior art arrangement of a wastewater treatment system and an exhaust gas treatment system.
Figure 19:
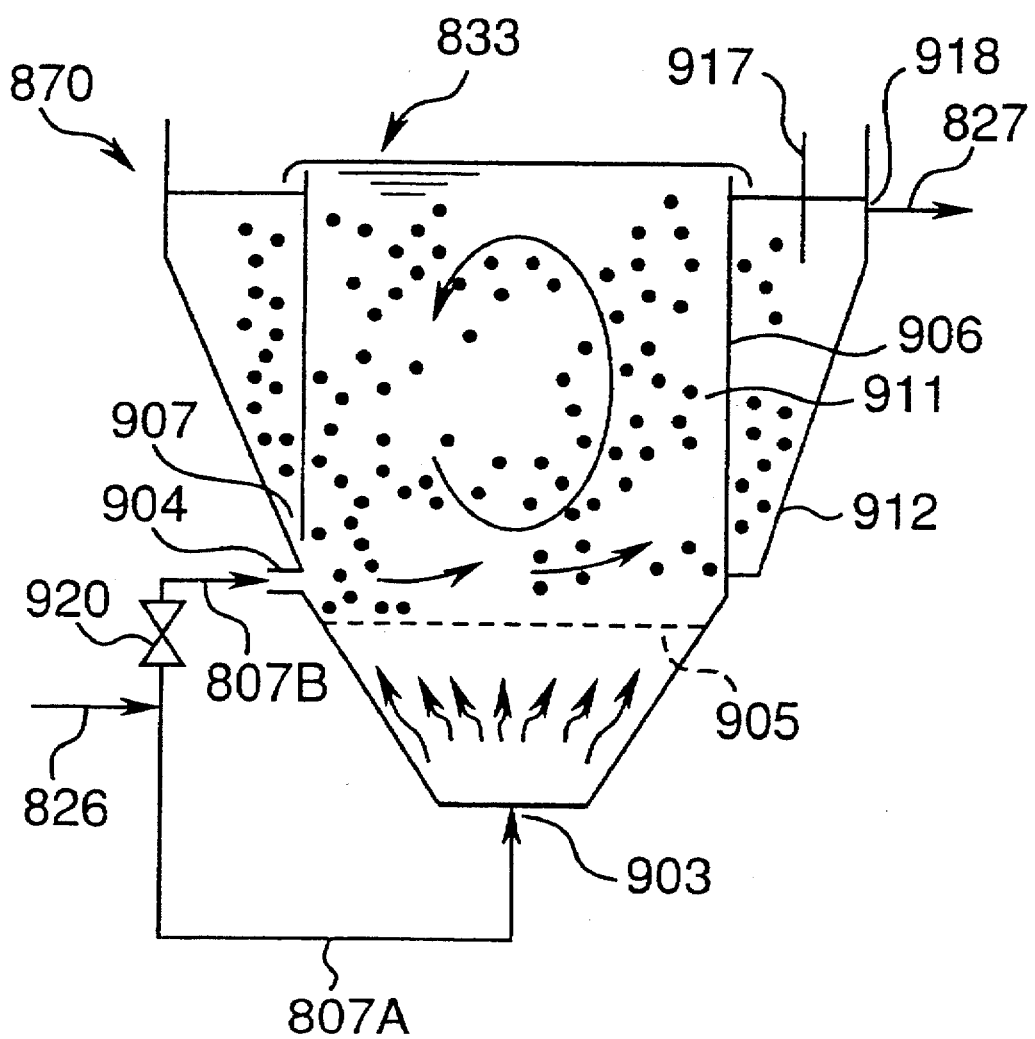
FIG. 19 is a conceptual view showing a prior art apparatus for removal of hydrogen peroxide.

Referring next to FIG. 14, there is shown a twelfth embodiment. The twelfth embodiment is a combined form of the tenth embodiment and the eleventh embodiment. This twelfth embodiment differs from the ninth embodiment shown in FIG. 11 in two points, namely, that the former includes a sludge return pipe 33 for returning sludge from the second tank 13 to the upper portion 1A of the first tank 1, and that it includes a filter unit 24 into which wastewater under treatment is introduced from the second tank 13, a water softening unit 25, a reverse osmosis membrane unit 26, and ultrapure water production equipment 27.

Therefore, the twelfth embodiment can provide ultrapure water in the same way as the eleventh embodiment can. Furthermore, since the embodiment, as is the case with the tenth embodiment, can improve the efficiency of wastewater treatment in the first tank 1 more than the ninth embodiment, this twelfth embodiment can exhibit improved capability of ultrapure water production as compared with the eleventh embodiment.

EXPERIMENTAL EXAMPLES

Next, one specific experimental example will be given. An organic matter-containing high-concentration fluorine wastewater treatment apparatus of the same construction as the one shown in FIG. 11 was employed wherein the acid water tank 62 had a capacity of about 0.4 m³, the first tank 1 had a capacity of about 1.6 m³, the microbial sludge agitator segment 12 had a capacity of about 0.4 m³, the second tank 13 had a capacity of about 0.4 m³, and the third tank (concentration tank) 16 had a capacity of about 0.3 m³.

In this experiment, treatment was carried out of wastewater containing fluorine and organic matter, such as surfactant, which, in its condition prior to treatment, had a pH of 6.2, a fluorine concentration of 723 ppm, and a TOC of 6.5 ppm as an organic matter content. As a result of treatment by the above described apparatus, the pH of the water was changed to 7.5, the fluorine concentration was reduced to not more than 6 ppm (about 1/121 of the concentration prior to the treatment), and the TOC to 1.1 ppm (about 1/6 of the level prior to the treatment).

Another experimental example is given. In this experiment, apparatus for reutilization of organic matter-containing high concentration fluorine wastewater of the same construction as the one shown in FIG. 13 was employed. In this apparatus, the acid water tank 62 had a capacity of 0.4 m³ the first tank 1 had a capacity of about 1.6 m³, the microbial sludge agitator segment 12 had a capacity of about 0.4 m³, the second tank 13 had a capacity of about 0.4 m³, and the concentration tank 16 had a capacity of about 0.3 m³. The filter unit 24 had a capacity of about 0.2 m³, and the reverse osmosis equipment 26 was of one-unit construction.

In this experiment, treatment was carried out of organic matter-containing fluorine wastewater which, in its condition prior to treatment, had a pH of 2.2, a fluorine concentration of 732 ppm, a TOC of 6.2 ppm as an organic matter content, and an electric conductivity of 1344 µs/cm. As a result of treatment by the above described apparatus, treated water of suitable quality for reutilization in the ultrapure water production equipment 27 was obtained such that the pH of the water was changed to 7.3, the fluorine concentration was reduced to not more than 0.5 ppm (about 1/1460 of the level prior to the treatment), the TOC to not more than 0.5 ppm (about 1/12 of the level prior to the treatment), and the electric conductivity to not more than 264 µs/cm (about 1/5 of the level prior to the treatment).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for wastewater treatment comprising:
    a first tank into which wastewater is to be introduced, said first tank including:
        an upper portion having a reactive filler and an aeration unit for fluidizing the reactive filler while aerating the reactive filler in the wastewater;
        a lower portion having an immobilizing carrier for microbial propagation disposed therein;
        an intermediate portion disposed between the upper portion and the lower portion and having an immobilizing carrier for microbial propagation disposed therein; and
        a circulation unit for transferring treated water that has been treated in the upper portion to the lower portion;
    wherein the immobilizing carrier of the intermediate and lower portions are formed of granules, the immobilizing carrier granules of the lower portion being of larger size than those of the intermediate portion, and wherein the upper portion of the first tank being operative so that the reactive filler is fluidized through the aeration caused therein so as to treat the wastewater by chemical reaction, the intermediate and lower portions of the first tank being operative so that organic matter in the wastewater is biologically treated by microorganisms fixed to the immobilizing carrier granules.

2. An apparatus for wastewater treatment as set forth in claim 1, wherein the size of the lower portion immobilizing carrier granules are greater than or equal to 2 cm in diameter.

3. An apparatus for wastewater treatment as set forth in claim 1, wherein the circulation unit for transferring treated water from the upper portion to the lower portion includes a strainer embedded in the immobilizing carrier of the lower portion such that under-treatment water from the upper portion is blown from the strainer into the lower portion.

4. An apparatus for wastewater treatment as set forth in claim 1, wherein the apparatus further includes a preparatory stage acid water tank into which wastewater is introduced under acid injection and in which a reactive filler is fluidized.

5. An apparatus for wastewater treatment as set forth in claim 1, wherein the immobilizing carrier in the intermediate and lower portions are comprised of same material as the reactive filler.

6. An apparatus for wastewater treatment as set forth in claim 5, wherein the reactive filler is comprised of calcium carbonate mineral.

7. An apparatus for wastewater treatment as set forth in claim 6, further comprising:
    a second tank into which is to be introduced treated water resulting from treatment of the wastewater in the first tank, the second tank including a fluorine concentration meter for measuring a concentration of fluorine in the treated water; and
    an aeration and circulation output control unit for controlling both an output of the aeration unit and an output of the circulation unit in the first tank according to the fluorine concentration measured by the fluorine concentration meter.

8. An apparatus for wastewater treatment as set forth in claim 7, further comprising:
    a sludge return unit for returning sludge separated by precipitation in the second tank to the first tank.

9. An apparatus for wastewater treatment as set forth in claim 8, further comprising:
    a filter unit into which treated water resulting from treatment in the second tank is to be introduced, a reverse osmosis unit, and an ultrapure water production unit into which treated water from the reverse osmosis unit is to be introduced for being made into ultrapure water.

10. An apparatus for wastewater treatment as set forth in claim 5, wherein the reactive filler is comprised of activated carbon.

11. An apparatus for wastewater treatment as set forth in claim 10, further comprising:
    a second tank into which is to be introduced treated water resulting from treatment of the wastewater in the first tank, the second tank including an oxidation-reduction potentiometer for measuring an oxidation-reduction potential of the treated water; and
    an aeration and circulation output control unit for controlling both an output of the aeration unit and an output of the circulation unit in the first tank according to the potential measured by the oxidation-reduction potentiometer.

12. An apparatus for wastewater treatment as set forth in claim 11, further comprising:
a sludge return unit for returning sludge separated by precipitation in the second tank to the first tank.

13. An apparatus for wastewater treatment as set forth in claim 12, further comprising:
a filter unit into which treated water resulting from treatment in the second tank is to be introduced, a reverse osmosis unit, and an ultrapure water production unit into which treated water from the reverse osmosis unit is to be introduced for being made into ultrapure water.

14. A method for wastewater treatment comprising:
providing a tank having a fluidization zone for fluidizing a reactive filler, a lower immobilization zone in which an immobilizing carrier for microorganisms is fixed, and an intermediate immobilization zone in which an immobilizing carrier for microorganisms is fixed;
causing wastewater to flow into the fluidization zone; and
circulating the wastewater between the fluidization zone and the immobilization zones by causing wastewater to flow from the fluidization zone to a diffuser embedded in the immobilization carrier of the lower immobilizing zone;
wherein the immobilizing carrier of the intermediate and lower immobilization zones are formed of granules, the immobilizing carrier granules of the lower immobilization zone being of larger size than those of the intermediate immobilization zone and wherein the wastewater is treated through chemical reaction of the reactive filler in the fluidization zone and is treated in the two immobilization zones by microorganisms propagated therein.

15. A method for wastewater treatment as set forth in claim 14, wherein the lower portion immobilizing carrier is formed of granules which are greater than or equal to 2 cm in diameter.

16. A method for wastewater treatment as set forth in claim 14, wherein the immobilizing carrier is comprised of same material as the reactive filler.

17. A method for wastewater treatment as set forth in claim 14, wherein a rate of circulation of the wastewater is varied according to a concentration of treated water discharged from the tank.

18. A method for wastewater treatment as set forth in claim 14, wherein the wastewater is pretreated by introducing the wastewater into a preparatory stage acid water tank under acid injection and fluidizing a reactive filler in the acid water tank.

19. An apparatus for wastewater treatment comprising:
a first tank into which wastewater is to be introduced, said first tank including:
an upper portion having a reactive filler, a separator wall for separating from the wastewater the reactive filler present therein, and an aeration unit for fluidizing the reactive filler while aerating the reactive filler in the wastewater;
a lower portion having an immobilizing carrier for microbial propagation and in which microorganisms are allowed to propagate;
a microbial sludge agitator segment located across the separator wall; and
a return unit for returning treated water from the microbial sludge agitator segment, in mixture with air, to the lower portion of the first tank in which the immobilizing carrier is fixed;
the upper portion of the first tank being operative so that the reactive filler is fluidized through the aeration caused therein so as to treat the wastewater by chemical reaction, the lower portion of the first tank being operative so that organic matter in the wastewater is biologically treated by the microorganisms.

20. An apparatus for wastewater treatment as set forth in claim 19, wherein the apparatus further includes a circulation unit for transferring treated water that has been treated in the upper portion to the lower portion.

21. An apparatus for wastewater treatment as set forth in claim 20, wherein the circulation unit for transferring treated water from the upper portion to the lower portion includes a strainer embedded in the immobilizing carrier of the lower portion such that under-treatment water from the upper portion is blown from the strainer into the lower portion.

22. An apparatus for wastewater treatment as set forth in claim 19, wherein the apparatus further includes a preparatory stage acid water tank into which wastewater is introduced under acid injection and in which a reactive filler is fluidized.

23. An apparatus for wastewater treatment as set forth in claim 19, wherein the immobilizing carrier is comprised of the same material as the reactive filler.

24. An apparatus for wastewater treatment as set forth in claim 23, wherein the reactive fillers comprise calcium carbonate mineral.

25. An apparatus for wastewater treatment as set forth in claim 24, further comprising:
a second tank into which is to be introduced treated water resulting from treatment of the wastewater in the first tank, the second tank including a fluorine concentration meter for measuring a concentration of fluorine in the treated water; and
an aeration and circulation output control unit for controlling both an output of the aeration unit and an output of the circulation unit in the first tank according to the fluorine concentration measured by the fluorine concentration meter.

26. An apparatus for wastewater treatment as set forth in claim 25, further comprising:
a sludge return unit for returning sludge separated by precipitation in the second tank to the first tank.

27. An apparatus for wastewater treatment as set forth in claim 26, further comprising:
a filter unit into which treated water resulting from treatment in the second tank is to be introduced, a reverse osmosis unit, and an ultrapure water production unit into which treated water from the reverse osmosis unit is to be introduced for being made into ultrapure water.

28. An apparatus for wastewater treatment as set forth in claim 23, wherein the reactive fillers comprise activated carbon.

29. An apparatus for wastewater treatment as set forth in claim 28, further comprising:
a second tank into which is to be introduced treated water resulting from treatment of the wastewater in the first tank, the second tank including an oxidation-reduction potentiometer for measuring an oxidation-reduction potential of the treated water; and
an aeration and circulation output control unit for controlling both an output of the aeration unit and an output of the circulation unit in the first tank according to the potential measured by the oxidation-reduction potentiometer.

30. An apparatus for wastewater treatment as set forth in claim 29, further comprising:

a sludge return unit for returning sludge separated by precipitation in the second tank to the first tank.

31. An apparatus for wastewater treatment as set forth in claim 27, further comprising:

a filter unit into which treated water resulting from treatment in the second tank is to be introduced, a reverse osmosis unit, and an ultrapure water production unit into which treated water from the reverse osmosis unit is to be introduced for being made into ultrapure water.

32. A method for wastewater treatment comprising:

providing in same tank a fluidization zone for fluidizing a reactive filler, a microbial sludge agitator segment, and an immobilization zone in which an immobilizing carrier for microorganisms is fixed;

causing wastewater to flow into the fluidization zone;

aerating the wastewater in the fluidization zone; and agitating the wastewater in the microbial sludge agitator segment; and mixing wastewater from the microbial sludge agitator segment with air, and circulating the wastewater/air mixture to a strainer embedded in the immobilizing carrier in the immobilization zone;

wherein the wastewater between the fluidization zone and the immobilization zone to treat the wastewater through chemical reaction of the reactive filler in the fluidization zone and to treat the wastewater in the immobilization zone by microorganisms propagated therein.

33. A method for wastewater treatment as set forth in claim 32, further comprising the step of aerating the wastewater in the microbial sludge agitator segment.

* * * * *